(12) United States Patent
Muikaichi et al.

(10) Patent No.: US 8,289,345 B2
(45) Date of Patent: Oct. 16, 2012

(54) DISPLAY DEVICE

(75) Inventors: Masahiro Muikaichi, Osaka (JP);
Masaki Horiuchi, Osaka (JP);
Mitsuhiro Aso, Osaka (JP); Takao Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 745 days.

(21) Appl. No.: 12/376,322

(22) PCT Filed: May 8, 2008

(86) PCT No.: PCT/JP2008/001157
§ 371 (c)(1),
(2), (4) Date: Feb. 4, 2009

(87) PCT Pub. No.: WO2008/139730
PCT Pub. Date: Nov. 20, 2008

(65) Prior Publication Data
US 2010/0156916 A1 Jun. 24, 2010

(30) Foreign Application Priority Data
May 8, 2007 (JP) ................................. 2007-123188

(51) Int. Cl.
*G09G 5/02* (2006.01)
(52) U.S. Cl. ........................................................ 345/629
(58) Field of Classification Search ................... 345/629
See application file for complete search history.

(56) References Cited

U.S. PATENT DOCUMENTS

| | | | | |
|---|---|---|---|---|
| 5,579,057 A | * | 11/1996 | Banker et al. | 348/589 |
| 5,604,544 A | * | 2/1997 | Bertram | 348/601 |
| 5,651,107 A | * | 7/1997 | Frank et al. | 715/768 |
| 5,754,170 A | * | 5/1998 | Ranganathan | 345/558 |
| 5,854,640 A | * | 12/1998 | North et al. | 345/547 |

(Continued)

FOREIGN PATENT DOCUMENTS

JP 9-90921 4/1997

(Continued)

OTHER PUBLICATIONS

Tracking a Tennis Ballusing Image Processing Techniquesa Thesis Submitted to the College of Graduate Studies and Research in Partial Fulfillment of the Requirements for the Degree of Master of Science in the Department of Computer Science University of Saskatchewan Saskatoon by Jinzi Mao, 2006.*

(Continued)

*Primary Examiner* — Javid A Amini
(74) *Attorney, Agent, or Firm* — Wenderoth, Lind & Ponack, L.L.P.

(57) ABSTRACT

A display device of the present invention displays a first image stored in first memory and a second image stored in second memory, by overlaying the first image on the second image. Once a display size/position of the first image is acquired, a first image generation unit is controlled to start generating the first image complying with the acquired display size/position. Until generation of the first image is completed, (i) a second image generation unit is controlled to generate an opaque second image that is opaque and large enough in size to cover the first image being generated, and (ii) the opaque second image is displayed. Upon completion of generation of the first image, (i) the second image generation unit is controlled to generate a partially transparent second image including a transparent part to be positioned over the first image, and (ii) the partially transparent second image is displayed.

7 Claims, 17 Drawing Sheets

U.S. PATENT DOCUMENTS

| | | | | |
|---|---|---|---|---|
| 6,067,092 A * | 5/2000 | Rinaldi et al. | | 345/629 |
| 6,144,415 A * | 11/2000 | Patton et al. | | 348/565 |
| 6,396,473 B1 * | 5/2002 | Callahan et al. | | 345/530 |
| 6,606,103 B1 * | 8/2003 | Hamlet et al. | | 715/764 |
| 6,672,963 B1 * | 1/2004 | Link | | 463/43 |
| 6,784,897 B2 * | 8/2004 | I | | 345/592 |
| 7,262,776 B1 * | 8/2007 | Wilt et al. | | 345/539 |
| 7,325,199 B1 * | 1/2008 | Reid | | 715/723 |
| 7,549,127 B2 * | 6/2009 | Chasen et al. | | 715/788 |
| 7,623,133 B1 * | 11/2009 | de Waal et al. | | 345/545 |
| 7,623,140 B1 * | 11/2009 | Yeh et al. | | 345/629 |
| 7,644,407 B2 * | 1/2010 | Cowperthwaite et al. | | 718/1 |
| 8,006,192 B1 * | 8/2011 | Reid et al. | | 715/762 |
| 2002/0067418 A1 * | 6/2002 | I | | 348/333.01 |
| 2002/0145611 A1 * | 10/2002 | Dye et al. | | 345/543 |
| 2004/0179019 A1 * | 9/2004 | Sabella et al. | | 345/537 |
| 2004/0261037 A1 * | 12/2004 | Ording et al. | | 715/788 |
| 2005/0271356 A1 | 12/2005 | Koresawa et al. | | |
| 2006/0033753 A1 * | 2/2006 | Lai | | 345/629 |
| 2006/0215061 A1 * | 9/2006 | Negishi et al. | | 348/584 |
| 2006/0284792 A1 * | 12/2006 | Foxlin | | 345/8 |
| 2007/0019094 A1 * | 1/2007 | Silberstein | | 348/333.01 |
| 2007/0260677 A1 * | 11/2007 | DeMarco et al. | | 709/203 |
| 2007/0273621 A1 * | 11/2007 | Yamashita et al. | | 345/76 |
| 2007/0296815 A1 * | 12/2007 | Isaksson et al. | | 348/157 |
| 2008/0094871 A1 * | 4/2008 | Parkinson | | 365/100 |
| 2008/0109719 A1 * | 5/2008 | Osawa et al. | | 715/273 |
| 2009/0069083 A1 * | 3/2009 | Okada et al. | | 463/31 |
| 2009/0138811 A1 * | 5/2009 | Horiuchi et al. | | 715/768 |
| 2009/0210820 A1 * | 8/2009 | Adachi et al. | | 715/786 |
| 2009/0249393 A1 * | 10/2009 | Shelton et al. | | 725/39 |
| 2010/0066762 A1 * | 3/2010 | Yeh et al. | | 345/629 |
| 2010/0156916 A1 * | 6/2010 | Muikaichi et al. | | 345/536 |
| 2010/0253763 A1 * | 10/2010 | Shioya et al. | | 348/36 |
| 2011/0092285 A1 * | 4/2011 | Yoshino et al. | | 463/31 |

FOREIGN PATENT DOCUMENTS

| | | |
|---|---|---|
| JP | 2004-302361 | 10/2004 |
| JP | 2005-351991 | 12/2005 |
| JP | 2006-98935 | 4/2006 |

OTHER PUBLICATIONS

A Tennis Ball Tracking Algorithm for Automatic Annotation of Tennis Match F. Yan, W. Christmas and J. Kittler Centre for Vision, Speech and Signal Processing University of Surrey Guildford, GU2 7XH, UK, 2005.*

International Search Report issued Jun. 17, 2008 in the International (PCT) Application of which the present application is the U.S. National Stage.

Chinese Office Action dated Dec. 1, 2000 in Chinese Patent Application No. 200880000465.X.

* cited by examiner

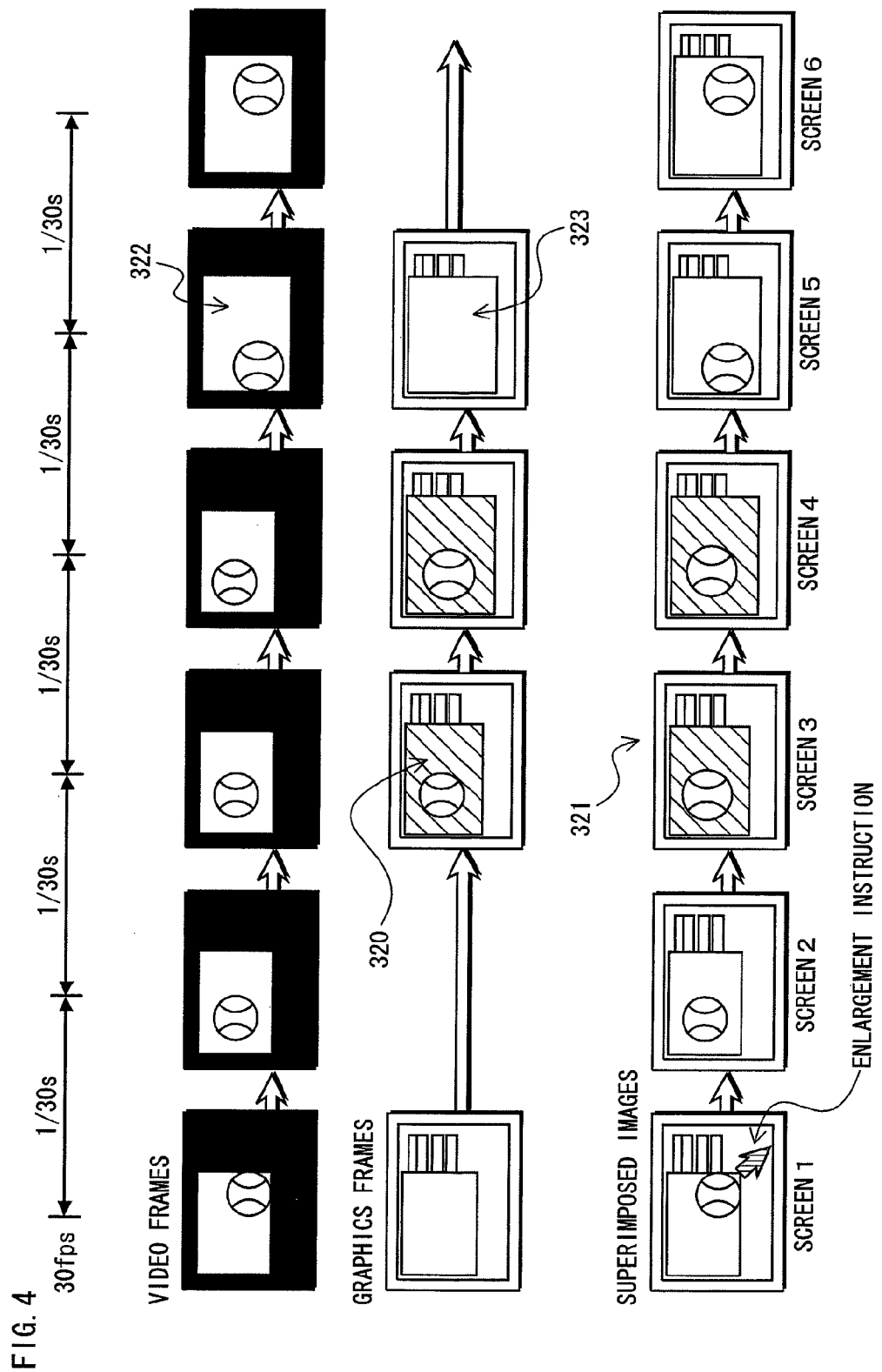

FIG. 5A

| OBJECT ID | ATTRIBUTE | ORIGIN | SIZE | STACK | ADDRESS |
|---|---|---|---|---|---|
| ID1 | GRAPHICS: CHARACTER STRINGS | (x1, y1) | (w1, h1) | 2 | addr1 |
| ID2 | GRAPHICS: PROGRAM LIST | (x2, y2) | (w2, h2) | 3 | addr2 |
| ID3 | VIDEO: MPEG4 | (x3, y3) | (w3, h3) | 1 | addr3 |

FIG. 5B

| IMAGE TYPE | ORIGIN | SIZE | OBJECT ID |
|---|---|---|---|
| VIDEO IMAGE | (x4, y4) | (w4, h4) | ID3 |
| DUMMY VIDEO IMAGE | (x10, y10) | (w10, h10) | ID3 |

FIG. 5C

| TIME (NUMBER OF FRAMES) | ORIGIN | SIZE | OBJECT ID |
|---|---|---|---|
| 3 | (x20, y20) | (w20, h20) | ID3 |

FIG. 6
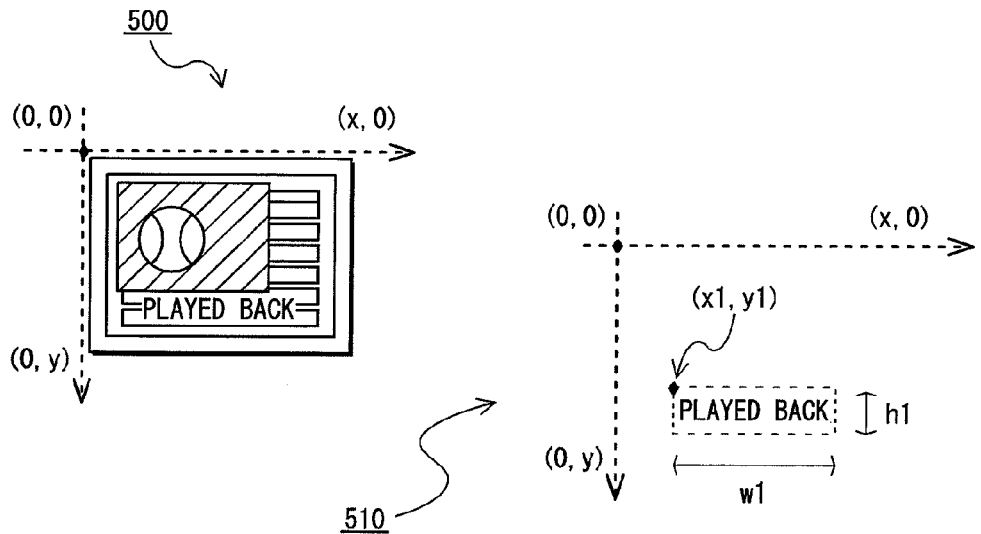
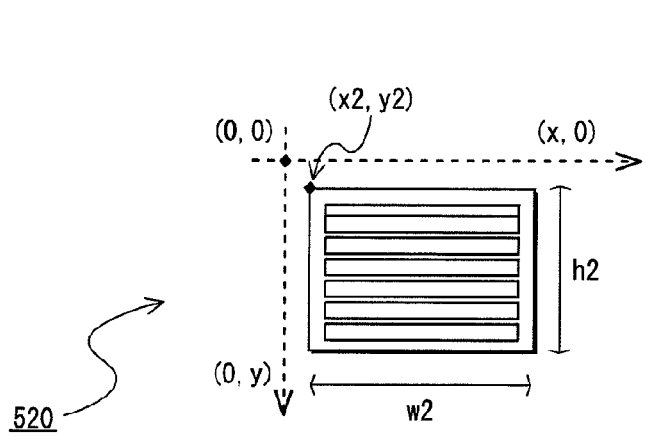
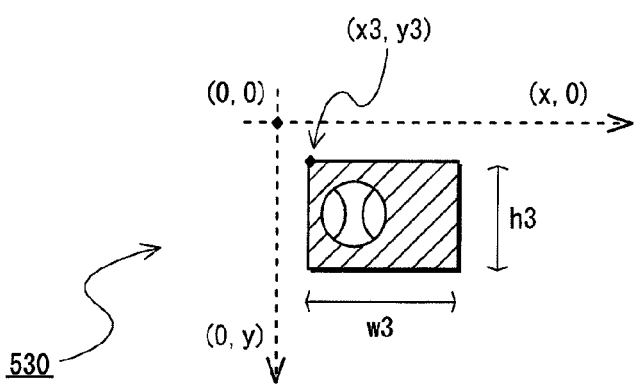

DISPLAY DEVICE

TECHNICAL FIELD

The present invention relates to a display device for displaying a moving image together with a still image (e.g., texts) by superimposing the moving image with the still image. In particular, the present invention relates to technology for displaying a moving image together with a still image while, for example, enlarging a display area in which the moving image is displayed.

BACKGROUND ART

It has been conventionally possible to display a moving image together with a still image on the same screen. This is called an On-Screen Display (OSD) and is used to display values on a part of the screen when a user sets the brightness of the screen or the like.

In recent years, some digital broadcast reception devices can superimpose a moving image (a program that is being broadcast) with a still image (e.g., a program guide transmitted by a broadcast station), and display them together. Other devices such as video recorders, video players, mobile telephones and digital cameras can also superimpose a moving image with a still image and display them together onto a screen.

One method to superimpose a moving image with a still image is to, after storing the moving image and the still image into different memories, display them by overlaying the still image on top of the moving image.

In this method, the superimposition is performed in such a manner that the still image includes a transparent part that would be positioned over the moving image, so that the moving image can be viewed through this transparent part. Thus, when the display size and position of the moving image are modified, the transparent part of the still image also has to be modified to conform to the new display size and position of the moving image.

Images constituting the moving image are updated at a predetermined frame rate. Accordingly, each time the update is done, the moving image needs to be superimposed and displayed with a still image. Here, if the timing of modifying the display size or the like of the moving image does not coincide with the timing of making the still image partially transparent, then the moving image and the still image would be misaligned when displayed on the screen—in other words, an undesired image would be displayed between borders of the moving image and borders of the still image.

In light of the above problem, there has been developed technology for matching the timing of making the still image partially transparent with the timing of modifying the moving image, so as to prevent the misalignment of the moving image and the still image on the screen (Patent Document 1).

Patent Document 1:
Japanese Laid-Open Patent Application No. 2004-302361

However, with the above technology, it is necessary to store (i) an instruction to make the still image partially transparent and (ii) the timing of displaying a still image whose transparent part has been modified. Furthermore, with the above technology, the processing of matching the stated timings with each other is performed by software; accordingly, depending on the progress made by other applications and the like, there are times when the stated timings do not precisely match each other, due to failure to reserve CPU for a necessary time period.

In view of the above problem, the present invention aims to provide a display device that can, without requiring an extra memory, display a moving image together with a still image without misalignment on a screen.

SUMMARY OF THE INVENTION

To achieve the above aim, the present invention provides a display device, comprising: a first memory; a second memory; an acquisition unit operable to acquire a display size and a display position of a first image to be displayed; a first image generation unit operable to generate, into the first memory, the first image complying with the display size and the display position acquired by the acquisition unit; a second image generation unit operable to generate a second image into the second memory; a control unit operable to (i) once the acquisition unit has acquired the display size and the display position, control the first image generation unit to start generating the first image so that the first image will be displayed in the acquired display size and the acquired display position, (ii) until the generation of the first image is completed, control the second image generation unit to generate, into the second memory, an opaque second image that is opaque and is large enough in size to cover the first image that is being generated, and (iii) upon completion of the generation of the first image, control the second image generation unit to generate, into the second memory, a partially transparent second image having a transparent part that is to be positioned over the first image; and a display unit operable to (i) until the generation of the first image is completed, display the opaque second image together with the first image that is being generated, and (ii) upon completion of the generation of the first image, display the partially transparent second image together with the first image that has been generated, so that the opaque second image or the partially transparent second image is overlayed on top of the first image.

EFFECTS OF THE INVENTION

According to the display device configured in the above manner, while the first image is being generated into the first memory, (i) the opaque second image, which is large enough in size to cover the first image that is being generated, is generated into the second memory, and (ii) the first image that is being generated is not visible to a viewer. This way, the first image is displayed on the screen upon completion of the generation of the first image into the first memory. More specifically, after the first image is generated into the first memory, the partially transparent second image stored in the second memory is made partially transparent.

Desirably, the timing of generating the first image into the first memory should match the timing of making the partially transparent second image, which is stored in the second memory, partially transparent. Even when it is difficult to precisely match the stated timings with each other, the present invention allows displaying the opaque second image that looks as if the stated timings are precisely met.

For example, a moving image (e.g., a video image) and a still image (e.g., a list of recorded programs) may be stored in the first and second memories, respectively. When the size of the moving image is modified, a part of the still image is made transparent in accordance with the size of the moving image.

Even if the display device of the present invention is configured such that the first image is displayed in a distorted manner while it is being generated into the first memory, the first image is not visible on the screen. The first image is displayed onto the screen when the generation of the first image into the first memory is completed.

The above display device may be configured in the following manners: the first image generation unit generates the first image into the first memory in accordance with one of frame images constituting a moving image, so that the first image would be displayed in a predetermined display size and a predetermined display position; the first image, which is generated by the first image generation unit under the control of the control unit, is based on the one of frame images; and the opaque second image is generated in accordance with the one of frame images, in accordance with which the first image is generated.

This way, images to be generated into the first and second memories are both generated from the same frame image. Hence, the time required to display an image complying with a modified display size and position onto the screen is shorter than the time required to display an image that has been generated in the first memory after its display size and position were modified. Accordingly, the transition to the image that has been generated in the first memory goes smooth on the screen.

The above display device may be configured such that the opaque second image is generated in a shorter time period than the first image is generated, and that the opaque second image is less accurate than the first image.

As set forth above, the second image generation unit generates an image in a shorter time period than the first image generation unit generates an image. Therefore, even when these images are generated from the same frame image, generation of an image into the second memory is completed while generation of an image into the first memory is still in progress.

The above display device may be configured such that the opaque second image includes (i) a first part whose display size and display position respectively comply with the display size and the display position of the first image, and (ii) a second part that is other than the first part.

This makes it possible to generate, into the second memory, (i) the first part from a frame image from which the first image is generated, and (ii) the second part that is other than the first part.

The above display device may be configured in the following manners: the first image generation unit generates the first image into the first memory from each of frame images constituting a moving image, so that the first image would be displayed in a predetermined display size and a predetermined display position; the first image is generated in accordance with one of the frame images; and the opaque second image is generated in accordance with another first image that is stored in the first memory when the first image generation unit is controlled to start generating the first image.

This way, while the first image generation unit is generating the first image into the first memory, the second image generation unit generates the opaque second image into the second memory from another first image stored in the first memory, i.e., an image that was displayed most recently. Accordingly, when the image that was displayed most recently is close in size to the opaque second image that the second image generation unit is to generate, the opaque second image can be generated in a short time period.

The above display device may be configured in the following manners: the first image generation unit generates the first image into the first memory from one of the frame images, so that the first image would be displayed in the predetermined display size and the predetermined display position; and the opaque second image is generated from one of the following that is closer to the opaque second image than another in size: (i) the one of frame images, from which the first image is generated, and (ii) another first image that is stored in the first memory when the first image generation unit is controlled to start generating the first image.

This way, while the first image generation unit is generating the first image into the first memory, the second image generation unit can generate the opaque second image into the second memory from one of the following that is closer in size to the first image to be generated than the other: (i) another first image stored in the first memory and (ii) the frame image. This allows generating the opaque second image in a shorter time period.

BRIEF DESCRIPTION OF THE DRAWINGS

FIG. 4 shows how a video image is enlarged in the invention of the present application.

FIG. 5A exemplarily shows the structure and contents of object information 1510.

FIG. 5B exemplarily shows the structure and contents of video image placement information 1520.

FIG. 5C exemplarily shows the structure and contents of modification instruction information 2310.

FIG. 6 shows a specific example of a relationship between a screen and objects.

DESCRIPTION OF CHARACTERS 100 700 800 display device
200 screen
1000 video data storage unit
1100 decode unit
1200 decoded image storage unit 1300 scale unit
1400 video frame storage unit
1500 7500 8500 display control unit
1600 video display control unit
1700 7700 8700 dummy video generation unit
1800 superimposition unit
2000 graphics data storage unit
2100 graphics generation unit
2200 graphics frame storage unit
2300 application processing unit
8710 image selection unit

DETAILED DESCRIPTION OF THE INVENTION

Embodiment 1

<Overview>

A display device of the present invention displays a moving image (e.g., a television broadcast image and a video playback image) and still images (e.g., texts and illustrations) at the same time on the same screen. When the display size of the moving image being displayed is enlarged or shrunk, or when a display position of the moving image is changed, the display device of the present invention can display the moving image and the still images on the screen without any troubles. Here, "troubles" include misalignment of the moving image and the still images on the screen, a temporal disruption in the video image, and the like.

For example, the misalignment of the moving image and the still images on the screen is caused by a mismatch between the display area of the moving image and transparent parts of the still images. Such misalignment occurs because the transparent parts of the still images are modified before the modification to the size and position of the moving image has been completed. To address this problem, during a time period over which the above alignment might occur, a display device of the present application does not make a still image partially transparent, but displays an opaque dummy image, which is for replacing a moving image, as a still image.

According to the present invention, a moving image is covered by and hidden behind a dummy image. Therefore, the present invention has the effect of not only solving the stated problem of misalignment of the moving image and the still images on the screen, but also solving other troubles such as a disruption in a displayed image.

Figure 2:
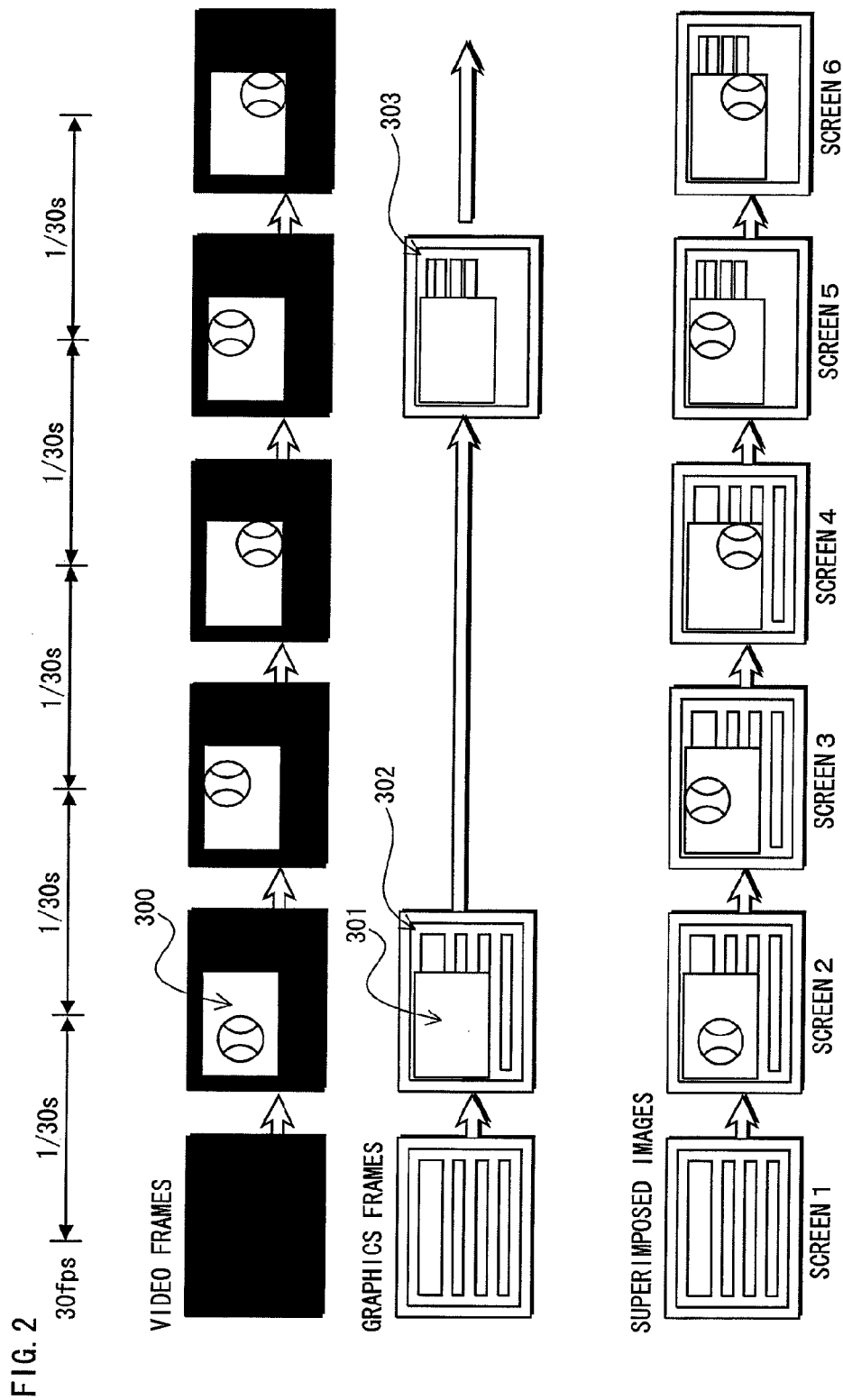
FIG. 2 shows a mechanism to display a moving image and still images on the same screen.
Figure 3:
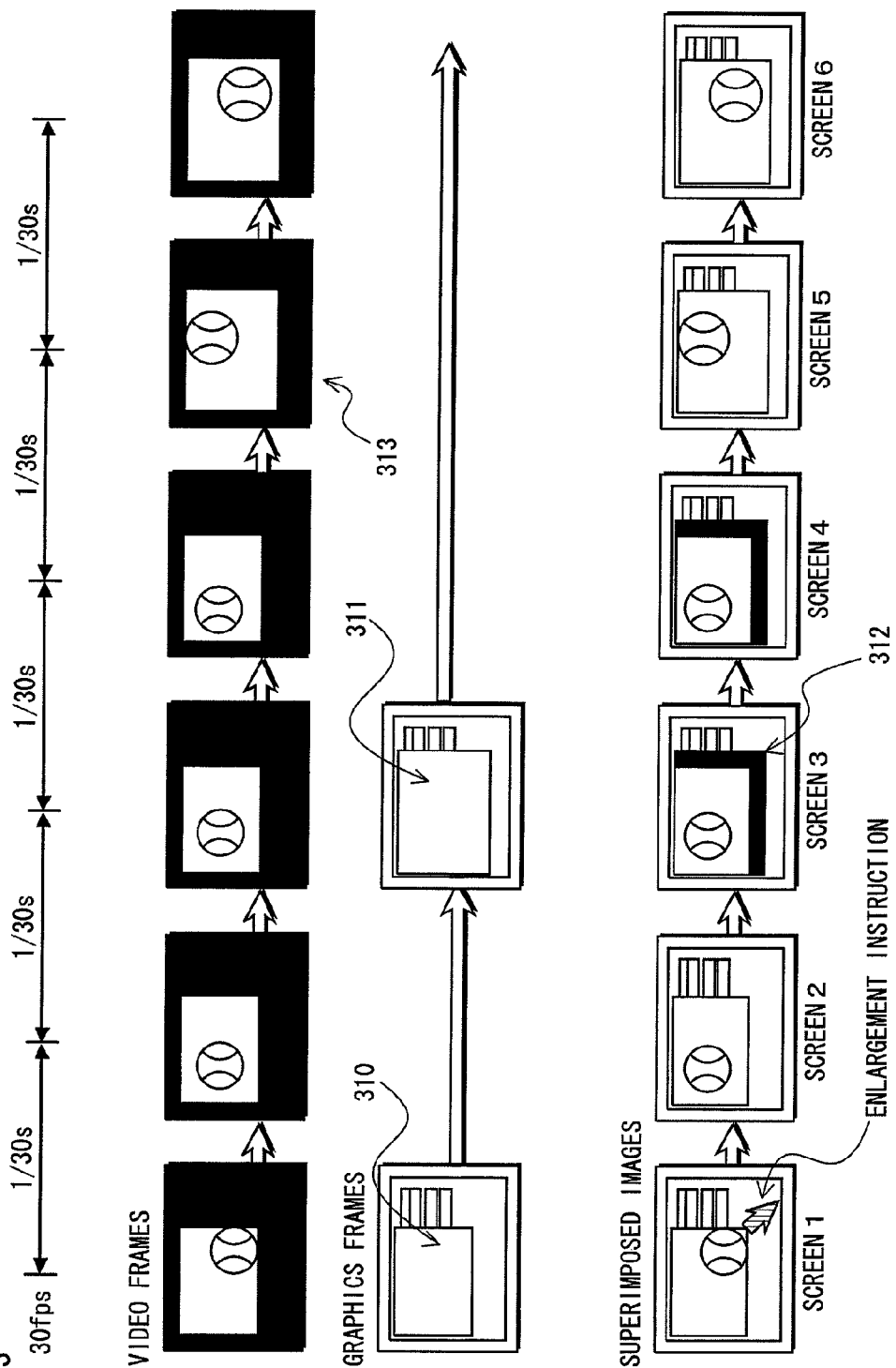
FIG. 3 illustrates a conventional problem (i.e., misalignment of images) that occurs when a video image is enlarged.

The following briefly describes the principle of the present invention, with reference to FIGS. 2 through 4.

Below, a mechanism to display a moving image and still images on the same screen is described with reference to FIG. 2, and a conventional problem that occurs therein is described with reference to FIG. 3. Thereafter, a brief explanation of FIG. 4 follows, illustrating a mechanism to display a moving image and still images on the screen according to the present invention.

FIG. 2 shows a mechanism to display a moving image and still images on the same screen.

"VIDEO FRAMES" denote frame images that constitute a moving image. "GRAPHICS FRAMES" denote frame images that constitute still images. Hereafter, the moving image is referred to as a "video", and the still images are referred to as "graphics".

"SUPERIMPOSED IMAGES" are each generated by superimposing one or more graphics frames with a video frame, so that the graphics frames are overlayed on top of the video frame. The superimposed images are images that are actually displayed on a screen. Here, the video is displayed at a frame rate of 30 fps (frame per second).

For example, to display a superimposed image 2, the following is performed: (i) a video image 300 having a predetermined size is generated in a video frame in a predetermined position; (ii) a graphics image 302 including a transparent part 301, which is to be positioned over the video image 300, is generated in a graphics frame; and (iii) the video frame is superimposed with the graphics frame, and the screen 2 is displayed in such a manner that the video image 300 can be viewed through the transparent part 301 of the graphics image 302. The screen 2 is, for example, a screen displaying a list of recorded programs as a graphics image, with an image of a baseball match (one of the recorded programs) played back in a small window (corresponding to the transparent part 301) overlayed on top of the list.

After a graphics image is updated, a video image is superimposed with a new graphics image 303, and a screen 4 is switched to a screen 5.

As shown in the screens 2 to 6 of FIG. 2, a moving image is displayed with each frame of a video image 300 being updated. The graphics images (302, 302) are each displayed as a still image.

FIG. 3 illustrates a conventional problem (i.e., misalignment of images) that occurs when a video image is enlarged.

The following description will be given under the assumption that a user has issued an instruction to enlarge the video image when a screen 1 is displayed.

In the graphics frames, upon receiving such an instruction, the transparent part 310 of the graphics image is enlarged so that its size will be as large as the size of the enlarged video image. As a result, a screen 3 displays an enlarged transparent part 311.

Meanwhile, with respect to the video frames, an enlarged video image 313 cannot be displayed until a screen 5 is displayed. When, for example, enlarging a video image, scaling and filtering are generally performed by hardware. This oftentimes results in a delay. In the example shown in FIG. 3, the enlarged video image is displayed with a two-frame delay compared to a graphics frame.

Consequently, as shown in the screens 3 and 4, an excess part 312 of the video frame, which does not belong to the video image, is shown through the transparent part of the graphics image. That is, the screens 3 and 4 each show misalignment of the video image and the graphics image.

FIG. 4 shows how the video image is enlarged in the present application.

In FIG. 4, an instruction to enlarge the video image is received when a screen 1 is displayed. In response, in the graphics frames, the transparent part 310 of the graphics image is not enlarged; instead, a dummy video image 320, which is for replacing the video image, is generated. The dummy video image 320 is an opaque image having a size large enough to cover/hide a current video image. In FIG. 4, a dummy video image has a diagonally hatched background.

When a screen 3 is displayed, the graphics frame is overlayed on the video frame. Here, as the graphics frame includes the dummy video image 320 instead of the transparent part 311, the screen 3 displays an image 321 of the graphics frame.

That is to say, unlike the screen 3 of FIG. 3, the screen 3 of FIG. 4 displays the dummy video image 320 together with the graphics image 321 without any misalignment. The screen 3 of FIG. 4 looks as if the processing of enlarging the video image has been promptly started.

Afterward, when an enlarged video image 322 is displayed in the video frames, a graphics image including an enlarged transparent part 323 is generated in the graphics frames.

A screen 5 displays, through the enlarged transparent part 323 of the graphics image, the video image 322 having the same size as the enlarged transparent part 323.

As set forth, when the size of a video image is modified, the present invention generates the dummy video image 320 in the graphics frames and displays the dummy video image 320, until the video image complying with the modified size is displayed in the video frames. This way, such a size modification can be promptly reflected on the screen, and image troubles are therefore not shown on the screen (see the screens 3 and 4 in FIGS. 3 and 4).

The following describes the display device pertaining to Embodiment 1 of the present invention, with reference to the accompanying drawings. It should be mentioned that although the present embodiment relates to enlarging a video image, the principle of the present embodiment can still be applied when shrinking the video image, when modifying the display position of the video image, when there occurs a disruption in images due to the enlargement or the like of the video image, and so on.

<Structure>

Figure 1:
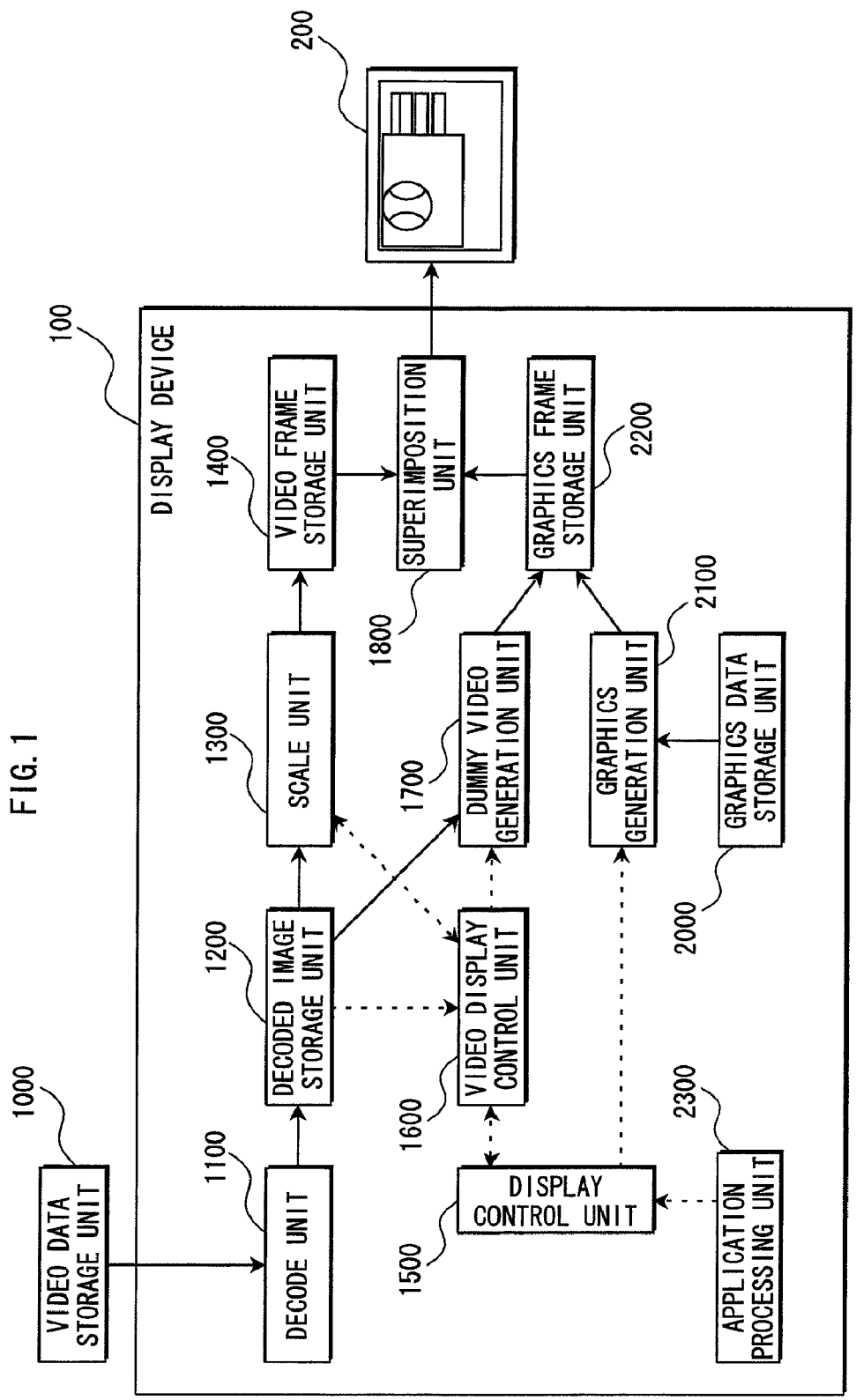
FIG. 1 is a functional block diagram of the structure of a display device 100.

FIG. 1 is a functional block diagram of the structure of a display device 100.

The display device 100 includes: a decode unit 1100; a decoded image storage unit 1200; a scale unit 1300; a video frame storage unit 1400; a display control unit 1500; a video display control unit 1600; a dummy video generation unit 1700; a superimposition unit 1800; a graphics data storage unit 2000; a graphics generation unit 2100; a graphics frame storage unit 2200; and an application processing unit 2300.

The display device 100 also includes an external video data storage unit 1000 for storing video data pieces (e.g., contents) and a screen 200.

The decode unit 1100 has functions of (i) receiving the video data pieces from the video data storage unit 1000 as streaming data pieces, (ii) generating decoded images by decoding the received streaming data pieces, and (iii) storing the decoded images into the decoded image storage unit 1200.

In the present embodiment, the video data pieces are input by the video data storage unit 1000. However, the video data pieces may be input via, for example, a network. Or, the video data pieces may be received as a television broadcast. The present embodiment will be described under the assumption that the video data pieces have been generated in accordance with the MPEG-4 (Moving Picture Experts Group-4) standard.

The decoded image storage unit 1200 has a function of storing therein the decoded images, which are the streaming data pieces decoded by the decode unit 1100. In the present embodiment, the decoded images stored in the decoded image storage unit 1200 are larger (i.e., have higher resolution) than images to be displayed on the screen. It is permissible that the stored decoded images are smaller (i.e., have lower resolution) than the images to be displayed on the screen.

The decoded image storage unit 1200 has a function of notifying the video display control unit 1600 of the image size of the decoded images, in response to an inquiry from the video display control unit 1600. It should be noted here that decoded images of video data pieces constituting a single video have the same image size.

The scale unit (i.e., first image generation unit) 1300 has functions of (i) performing processing of shrinking each decoded image to a predetermined size, modifying a display position of each decoded image, and so on (hereinafter, "scale processing"), and (ii) generating, into the video frame storage unit (i.e., first memory) 1400, video images which are each obtained by performing scale processing on the corresponding one of the decoded images. More specifically, the scale unit 1300 draws, into the video frame storage unit 1400, pixel data pieces of the video images to be displayed on the screen, and stores the drawn pixel data pieces into the video frame storage unit 1400.

The video frame storage unit 1400 stores therein the video images, which are the decoded images that have been subjected to the scale processing by the scale unit 1300, as an assemblage of pixel data pieces on a frame-by-frame basis.

The display control unit (i.e., control unit) 1500 has a function of controlling (i) modifications made to the size or the like of each video image, and (ii) display of dummy video images and graphics images. More specifically, upon receiving an instruction to, for example, enlarge a video image from the application processing unit 2300, the display control unit 1500 instructs the video display control unit 1600 to modify the size or the like of the video image, manages the order in which images are overlayed in graphics frames, and so on.

The video display control unit 1600 has a function of, upon receiving the instruction from the display control unit 1500, controlling (i) scale processing performed on a video image, and (ii) processing of generating a dummy video image.

More specifically, the video display control unit 1600 instructs the dummy video generation unit 1700 to generate a dummy video image, after obtaining (i) an instruction issued to the scale unit 1300 to modify the size or the like of a video image and (ii) the size of the decoded images from the decoded image storage unit 1200. Furthermore, upon receiving from the scale unit 1300 a notification indicating completion of the scale processing on the video image, the video display control unit 1600 instructs the dummy video generation unit 1700 to generate a transparent part in a graphics image.

The dummy video generation unit 1700 has a function of, upon receiving the instruction from the video display control unit 1600, generating a dummy video image and storing the same into the graphics frame storage unit 2200. More specifically, the dummy video generation unit 1700 (i) generates, from a decoded image based on which a video image is generated, a dummy video image to be displayed onto the screen, and (ii) draws pixel data of the generated dummy video image into the graphics frame storage unit 2200. Furthermore, under the instruction issued by the video display control unit 1600, the dummy video generation unit 1700 can make a specified part of each graphics image transparent, i.e., generate an entirely transparent graphics image.

In the present embodiment, a scale filter used in the scale unit 1300 is of a higher-order than that used in the dummy video generation unit 1700. In other words, an image generated by the scale unit 1300 has higher accuracy than an image generated by the dummy video generation unit 1700. Accordingly, in a case where the scale unit 1300 and the dummy video generation unit 1700 perform scale processing on the same image, the scale processing performed by the dummy video generation unit 1700 takes less time than that performed by the scale unit 1300.

The graphics generation unit (i.e., second image generation unit) 2100 has a function of, upon receiving the instruction from the display control unit 1500, generate a graphics image into the graphics frame storage unit (i.e., second memory) 2200. More specifically, the graphics generation unit 2100 draws, into the graphics frame storage unit 2200, pixel data of a graphics image to be displayed onto the screen. Here, the graphics image is generated from data stored in the graphics data storage unit 2000.

The graphics data storage unit 2000 stores therein data from which the graphics generation unit 2100 generates a graphics image. The present embodiment will be described under the assumption that the graphics data storage unit 2000 stores therein data of, for example, a list of recorded programs, a program guide and character strings.

The graphics frame storage unit 2200 stores therein the dummy video image generated by the dummy video generation unit 1700 and the graphics image generated by the graphics generation unit 2100, as an assemblage of pixel data pieces on a frame-by-frame basis.

The superimposition unit (i.e., display unit) 1800 has a function of (i) superimposing an image (second image) stored in the graphics frame storage unit (second memory) 2200 with an image stored in the video frame storage unit (first memory) 1400, and (ii) displaying these images onto the screen 200. Here, the superimposition is performed by overlaying the image (second image) stored in the graphics frame storage unit 2200 on top of the image (first image) stored in the video frame storage unit 1400.

In response to an instruction received from the user, the application processing unit 2300 of the present embodiment performs processing of, for example, displaying a list of recorded programs and playing back one of the recorded programs selected from the list. Furthermore, upon receiving an instruction from the user to, for example, modify the size of a video image that is currently played back, the application processing unit 2300 of the present embodiment can notify the display control unit 1500 of such an instruction.

It should be mentioned here that all or part of the processing performed by each constituent element (e.g., the display control unit 1500) may be realized by CPU (not illustrated) performing a corresponding program.

<Data>

Below is a description of data pieces that are mainly used in the display device 100, with reference to FIGS. 5 and 6.

FIG. 5A exemplarily shows the structure and contents of object information 1510. FIG. 5B exemplarily shows the structure and contents of video image placement information 1520. The object information 1510 and the video image placement information 1520 are stored in an internal memory provided in the display control unit 1500.

FIG. 5C exemplarily shows the structure and contents of modification instruction information 2310. When the application processing unit 2300 instructs the display control unit 1500 to modify the size or the like of a video image, the application processing unit 2300 provides the modification instruction information 2310 to the display control unit 1500.

First, the description of the object information 1510 shown in FIG. 5A is given below.

"Objects" denote elements constituting each graphics image stored in the graphics frame storage unit 2200. More specifically, a still image is referred to as a graphics object, and a dummy video image is referred to as a video object. Here, a still image means an image composed of one or more items such as diagrams, graphics, and texts. A still image may be an image composed of a combination of these items. In the present embodiment, a video object is a dummy video image corresponding to a video image which is a playback image of a recorded program, whereas a graphics object is a still image, for example, an image showing a list of recorded programs or a still image showing character strings.

The object information 1510 shows: an object ID 1511; an attribute 1512; an origin 1513; a size 1514; a stack 1515; and an address 1516.

The purpose the object information 1510 is to manage one or more objects displayed on the screen 200.

An object ID 1511 is an identifier of an object displayed on the screen 200. For example, FIG. 5A shows three objects, and three object IDs ("ID1", "ID2" and "ID3") are assigned to these three objects in one-to-one correspondence.

In other words, these three objects, to which the above object IDs are assigned, are stored in the graphics frame storage unit 2200.

The attribute 1512 shows an attribute of an object, and indicates one of "graphics" and "video". When the attribute 1512 indicates "graphics", the corresponding object is a graphics object. When the attribute 1512 indicates "video", the corresponding object is a video object.

In FIG. 5A, the comments following ":" mean what exactly the corresponding object is. For example, "graphics: character strings" indicates that the corresponding graphics object is composed of character strings, and "video: MPEG-4" indicates that the corresponding video object is associated with a video image that has been encoded in accordance with the MPEG-4 standard.

The origin 1513 indicates the position of the upper left corner of an object on the screen. The size 1514 indicates the width and height of an object.

The stack 1515 shows layer numbers indicating the order of layering objects to be superimposed and displayed. The objects are layered in ascending order of layer numbers shown by the stack 1515. Hence, referring to FIG. 5A, an object to be displayed as a top layer is the object whose stack 1515 and object ID 1511 show "1" and "ID3", respectively.

The address 1516 indicates an address from which image data of an object is obtained. In the present embodiment, the address 1516 shows addresses of different storage units. For example, the attribute 1512 of the object whose object ID 1511 is "ID1" is "graphics", which means that image data of this object is stored in "addr1" of the graphics data storage unit 2000. The attribute 1512 of the object whose object ID 1511 is "ID3" is "video", which means that image data of this object is stored in "addr3" of the decoded image storage unit 1200. This address "addr3" is an address in which the latest decoded image is stored.

Described below, with reference to FIG. 6, is a relationship between a graphics image and the origin 1513, size 1514, and stack 1515 of each object.

FIG. 6 exemplarily shows a relationship between a screen and each object. A screen 500 is composed of two graphics objects (510 and 520) and one video object (530).

The object IDs 1511 of the objects 510, 520 and 530 are "ID1", "ID2" and "ID3", respectively.

The origin 1513 of each object is expressed by coordinates plotted in the coordinate system on the screen 500. The superimposition unit 1800 superimposes the objects in accordance with the coordinate system.

First, when there is more than one graphics object, these graphics objects are layered in order of ascending layer number.

For example, in order to layer the objects that are managed by the object information 1510 of FIG. 5A, an image of the graphics object 520, whose stack 1515 indicates "3", is generated first. Then, the graphics object 510, whose stack 1515 indicates "2", is overlayed on top of the graphics object 520. Finally, the video object 530, whose stack 1515 indicates "1", is overlayed on top of the graphics object 510. A layer of these objects is stored in the graphics frame storage unit 2200 as a graphics image.

The superimposition unit 1800 (i) superimposes an image stored in the video frame storage unit 1400 with the graphics image stored in the graphics frame storage unit 2200, by overlaying the latter on top of the former, and (ii) display these images. The video object 530 shown in FIG. 6 is a dummy video image; therefore, when the video object 530 is superimposed and displayed, the video image stored in the video frame storage unit 1400 would not be shown. However, when the video object 530 is made transparent, the screen displays the superimposed image in which the video image stored in the video frame storage unit 1400 is shown.

It should be noted that the present embodiment is described under the assumption that it is not possible to display more than one video object at the same time.

The following describes the video image placement information 1520 shown in FIG. 5B.

The purpose the video image placement information 1520 is to manage placement information of a video image being displayed on the screen and placement information of a dummy video image. One piece of video image placement information 1520 is generated in association with one video image. Therefore, when a plurality of video images are displayed, the same number of video image placement information pieces 1520 are stored. The present embodiment is described under the assumption that there is only one video image displayed.

The video image placement information 1520 shows: an image type 1521; an origin 1522; a size 1523; and an object ID 1524.

The image type 1521 indicates a type of a video image. In the present embodiment, there are two types of video images: "video image" and "dummy video image".

The "video image" denotes a video image stored in the video frame storage unit 1400. The "dummy video image" is a dummy video image stored in the graphics frame storage unit 2200.

The origin 1522 indicates the position of the upper left corner of an image. The size 1523 indicates the width and height of size of the image. Here, the origin 1522 and the size 1523 of the "video image" indicate the size and the like of the video image that is currently being displayed. Once an instruction to modify the size and position of the currently displayed video is issued, the origin 1522 and the size 1523 of the "video image" are updated as soon as the modification of the size and position of the currently displayed video image is completed. The origin 1522 and the size 1523 of the "dummy video image" store the size and the like of the dummy video image to be displayed.

The object ID 1524 is an identifier that identifies an object. The same identifier is assigned to a video image and a dummy video image that correspond to each other.

The following describes the modification instruction information 2310 of FIG. 5C.

The modification instruction information 2310 shows: time 2311; an origin 2312; a size 2313; and an object ID 2314.

The time 2311 indicates an approximate time period required to complete processing of modifying a video image. In the present embodiment, the time 2311 is expressed as the number of frames. The time 2311 may be expressed in any manner, as long as a time period required to display a dummy video image can be identified by the time 2311. Alternatively, the time 2311 may be expressed in seconds.

The origin 2312 and the size 2313 indicate the definitive position and size of a video image. They are similar to the origin 1522 and the size 1523 of the video image placement information 1520, respectively.

For example, if the time 2311 indicates "3", then the origin and size of the dummy video image should respectively match "(x20,y20)", which is indicated by the origin 2312, and "(h20,w20)", which is indicated by the size 2313, with a three-frame delay.

The object ID 2314 is an identifier that identifies an object to be modified.

<Operations>

Figure 7:
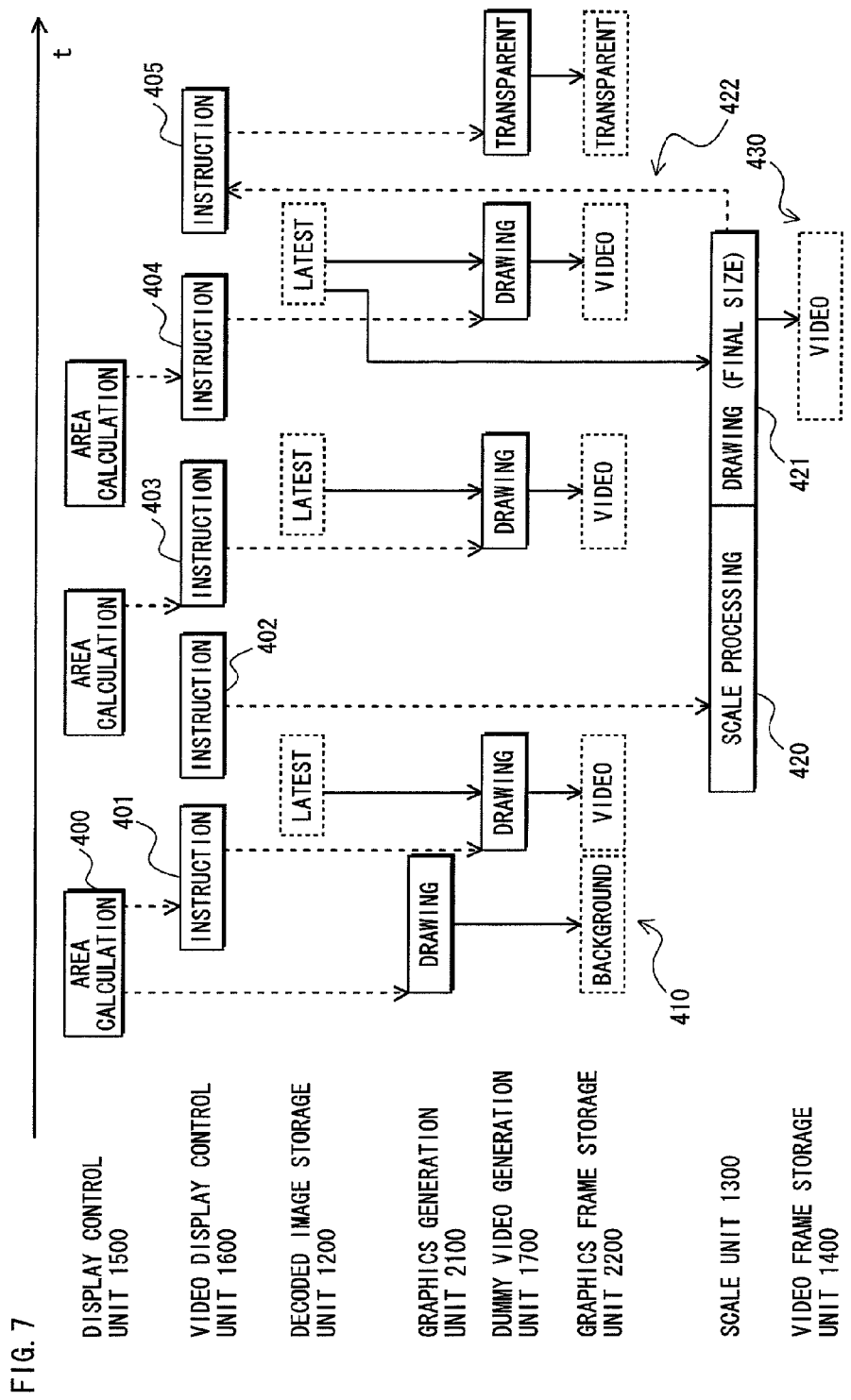
FIG. 7 is a timing diagram showing processing performed by functional components to enlarge a video image.
Figure 8:
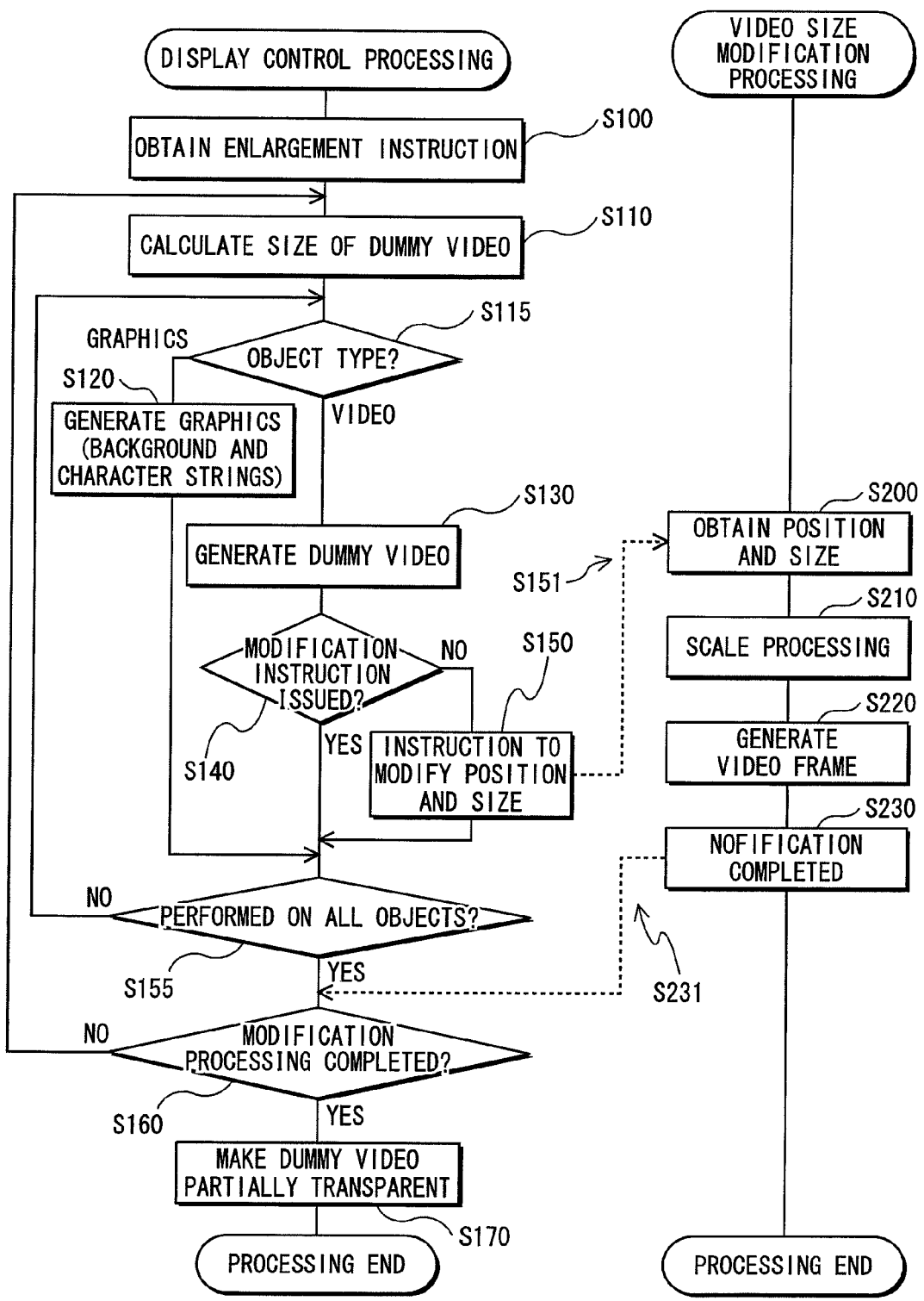
FIG. 8 is a flowchart of display control processing and modification processing for modifying the size or the like of the video image.

The following describes operations of the display device 100 pertaining to the present invention, with reference to FIGS. 7 and 8.

FIG. 7 is a timing diagram showing processing performed by functional components to enlarge a video image.

Referring to FIG. 7, each rectangle outlined by solid lines indicates the time when the processing shown therein is performed by a corresponding one of the functional components listed to its left. Each rectangle outlined by dotted lines indicates image data that is either (i) stored in or (ii) being generated into a corresponding one of the storage units (1200, 1400 and 2200) listed to its left. Each solid arrow indicates transmission of image data, and each dotted line indicates an instruction, a notification, or the like. The same principle applies to FIGS. 1 and 15. To assist comprehension, scale processing (processing 420) and drawing (processing 421) are illustrated separately in FIG. 7. The scale processing and drawing are usually considered to be one single processing.

Described below is the timing of performing processing after the display control unit 1500 receives, from the application processing unit 2300, an instruction to enlarge a video image.

The display control unit 1500 calculates the position and size of a dummy video image based on (i) the modification instruction information 2310, which was provided thereto when receiving the instruction to enlarge the video image, and (ii) the time when it received the instruction (processing 400). Here, it is assumed that the size of a dummy video image is increased gradually, and the position and size of the first dummy video image generated are the same as the position and size of the current video image.

First, the display control unit 1500 instructs the graphics generation unit 2100 to draw a graphics image, such as a background, into the graphics frame storage unit 2200. Next, via the video display control unit 1600, the display control unit 1500 instructs the dummy video generation unit 1700 to draw a dummy video image into the graphics frame storage unit 2200 (processing 401) (see image data 410). Here, the dummy video image is generated based on the latest decoded image stored in the decoded image storage unit 1200.

As a result of this act of drawing, the screen displays the graphics image together with the dummy video image (see the screen 3 of FIG. 4).

After instructing the dummy video generation unit 1700 to generate the dummy video image, the display control unit 1500 instructs the scale unit 1300 to perform scale processing on the video image (processing 402).

While the scale unit is performing the scale processing (processing 420), the display control unit 1500 calculates the size or the like of a dummy video image to be displayed next. Then, via the video display control unit 1600, the display control unit 1500 instructs the dummy video generation unit 1700 to draw a dummy video image having the calculated size (processing 403).

As a result of this act of drawing, the screen displays the dummy video image that is slightly larger than the previously displayed dummy video image (see the screen 4 of FIG. 4).

Upon completion of the scale processing (processing 420), i.e., once the video image complying with the definitive position and size is drawn into the video frame storage unit 1400 (see processing 421 and image data 430), the scale unit 1300 notifies the video display control unit 1600 of completion of modification (notification 422).

Once the video display control unit 1600 is notified of the completion of modification to the video image, the video display control unit 1600 instructs the dummy video generation unit 1700 to make a part of the dummy video image transparent (processing 405). Then, the video display control unit 1600 notifies the display control unit 1500 of completion of modification.

At this point, the screen displays the video image together with the graphics image (see the screen 5 of FIG. 4).

Via the video display control unit 1600, the display control unit 1500 draws dummy video images so that their sizes gradually increase and become greater than the size of a previous dummy video image, until (i) the display control unit 1500 receives a notification of completion of modification, or (ii) the dummy video image complies with the definitive position and size of the video image (processing 404).

FIG. 8 is a flowchart of display control processing and modification processing for modifying the size or the like of a video image.

The display control processing described here is performed by the display control unit 1500, the video display control unit 1600, and the dummy video generation unit 1700. The modification processing described here is performed by the scale unit 1300.

The following description will be given under the assumption that a user (i) displayed a list of recorded programs on the screen 200, (ii) selected one of the recording programs in the list, and (iii) has been playing back the selected program in a small window overlayed on top of the list of the recorded programs (see FIG. 2).

First, the user inputs an instruction to enlarge a video image. Upon detecting the user input, the application processing unit 2300 instructs the display control unit 1500 to enlarge the video image, and provides the modification instruction information 2310 to the display control unit 1500. As the modification is going to be made on a video image, an object whose attribute information 1512 in the object information 1510 indicates "video" is specified. For example, the object ID 2314 of the modification instruction information 2310 indicates "ID3".

Upon receiving the instruction to enlarge the video image (Step S100), the display control unit 1500 calculates the position and the size of a dummy video image to be displayed, and stores the calculated position and size into video image placement information 1520 that shows the same object ID (1524) as the object ID (2314) shown by the modification instruction information 2310 (Step S110).

Here, the size of the dummy video image is calculated with use of (i) the size or the like of a video image that is currently being displayed, and (ii) the size or the like of a specified video image. Specifically, the size or the like of the video image that is currently being displayed denotes the origin 1522 and the size 1523 of an object whose image type 1521 indicates "video image" in the video image placement information 1520. The size or the like of the specified video image denotes the origin 2312 and the size 2313 indicated by the received modification instruction information 2310.

For example, assume that the position 1522 and the size 1523 of the current video image (at time T1) are respectively (x4,y4) and (w4,h4), and the position 2312 and the size 2313 of the specified video image are respectively (x20,y20) and (w20,h20). When a video image becomes linearly larger in size over time since the time of receiving the instruction to enlarge the video image, the position (x,y) and the size (w,h) of the dummy video image change with time t in the following manner. It is assumed that the specified time 2311 indicates "3" (frames). Note, there is no need to linearly modify the dummy video image. The dummy video image may be defined by any function.

$$x(t)=x4+(x20-x4)*(t-T1)/3$$

$$y(t)=y4+(y20-y4)*(t-T1)/3$$

$$w(t)=w4+(w20-w4)*(t-T1)/3$$

$$h(t)=h4+(h20-h4)*(t-T1)/3$$

After calculating the position and size of the dummy video object, the display control unit 1500 generates a graphics image in accordance with the stack 1515 of the object information 1510.

First, the display control unit 1500 generates an object whose stack 1515 shows the largest value.

When the attribute 1512 of the object indicates "graphics" (Step S115: GRAPHICS), the display control unit 1500 instructs the graphics generation unit 2100 to generate a graphics object (Step S120).

More specifically, the display control unit 1500 (i) provides the graphics generation unit 2100 with the origin 1513, the size 1514, and the address 1516 of the object to be generated, and (ii) instructs the graphics generation unit 2100 to generate an image. Upon receiving the instruction, the graphics generation unit 2100 reads image data from the address 1516, and generates the image into the graphics frame storage unit 2200.

When the attribute 1512 of the object indicates "video" (Step S115: VIDEO), the display control unit 1500 instructs the video display control unit 1600 to generate a video object, i.e., a dummy video image (Step S130).

More specifically, the display control unit 1500 (ii) provides the video display control unit 1600 with the calculated position and size of the dummy video image and the address 1516 corresponding to the object ID 2314 of the modification instruction information 2310, and (ii) instructs the video display control unit 1600 to generate an image. For example, the display control unit 1500 provides the video display control unit 1600 with (i) the origin 1522 "(x10,y10)" and the size 1523 "(w10,h10)" of an object whose image type 1521 indicates "dummy video image" in the video image placement information 1520, and the address 1516 "addr3" of an object whose object ID 1511 indicates "ID3".

The video display control unit 1600 (i) obtains the size of a decoded image from the decoded image storage unit 1200, (ii) provides the dummy video generation unit 1700 with the obtained size and information (e.g., the origin) received from the display control unit 1500, and (iii) instructs the dummy video generation unit 1700 to generate a dummy video image.

Upon receiving the instruction, the dummy video generation unit 1700 refers to the received address 1516 so as to generate, into the graphics frame storage unit 2200, a dummy video image from the image data read from the decoded image storage unit 1200.

After issuing the instruction to generate the object, the video display control unit 1600 instructs the scale unit to modify the size or the like of a video image to a specified size or the like (Step S150), if the video display control unit 1600 has not instructed the scale unit to perform such scale processing on the video image yet (Step S140: NO). More specifically, the video display control unit 1600 (i) updates the origin 1513 and the size 1514 of the object whose object ID 1511 indicates "ID3" in the object information 1510, so that they newly indicate the origin 2312 and the size 2313 shown in the modification instruction information 2310, and (ii) provides the scale unit with information associated with the object whose object ID 1511 is "ID3" (1512 to 1516) (Step S151). It should be noted here that in the present embodiment, only one video image is displayed at a time; accordingly, there is only one dummy video image that corresponds thereto. However, in a case where more than one video image will be displayed at a time, the judgment about whether or not to issue an instruction to perform scale processing is made in association with each of the dummy video images.

When there is one or more objects that have not been displayed yet (Step S155: NO), the superimposition unit 1800 generates a next object whose stack 1515 shows the next largest value (Step S115).

For example, in order to layer the objects that are managed by the object information 1510 of FIG. 5A, an image showing the list of the recorded programs, which is a graphics object whose object ID 1515 is "ID2", is generated first. Next, an image showing character strings, which is a graphics object whose object ID 1515 is "ID1", is generated. Finally, a dummy video image, which is a video object whose object ID 1511 is "ID3", is generated.

If the notification of completion of scale processing has not been received from the scale unit 1300 yet (Step S160: NO) even after all the objects were generated (Step S155: YES), the video display control unit 1600 notifies the display control unit 1500 that the scale processing has not been completed yet.

Upon receiving the notification that the scale processing has not been completed yet, the display control unit 1500 calculates the position and size of a dummy video image to be displayed next (Step S110) and repeats processing from Steps S115 to S160. Here, however, the processing of Step S150 is not performed, as the video display control unit 1600 has already instructed the scale unit 1300 to perform the scale processing (Step S140: YES).

If the notification of completion of scale processing has been received from the scale unit 1300 (Step S160: YES), the video display control unit 1600 notifies the display control unit 1500 that the scale processing has been completed. Here, in a case where the size of a dummy video image is gradually increased, the display control unit 1500 is notified of the completion of scale processing as soon as the scale processing is completed, even if the position and size of the last dummy video image do not comply with the specified position and size. Note, in a case where the size of a dummy video image is gradually increased, it is permissible that the video display control unit 1600 notifies the display control unit 1500 of the completion of scale processing, if the following conditions are both satisfied: a dummy video image complying with the specified position and size is displayed; and the notification of completion of scale processing is received.

The video display control unit 1600 instructs the dummy video generation unit 1700 to make a part of a dummy video image, which is to be positioned over a video image, transparent. More specifically, at the time of issuing such an instruction to the dummy video generation unit 1700, the video display control unit 1600 also provides the dummy video generation unit 1700 with the position and the size that the video display control unit 1600 provided to the scale unit 1300 when instructing the scale unit 1300 to perform the scale processing (see Step S150).

Upon receiving the instruction to make a part of a dummy video image transparent, the dummy video generation unit 1700 makes a rectangular part of a corresponding dummy video image transparent, the rectangular part being identified by the received origin 1513 and size 1514, and the corresponding dummy video image being stored in the graphics frame storage unit 2200 (Step S170).

Upon receiving the notification of completion of scale processing, the display control unit 1500 updates the origin 1522 and the size 1523 of the object whose image type 1521 indicates "video image" in the video image placement information 1520, so that they newly indicate the origin 2312 and the size 2313 shown in the modification instruction information 2310. This is the end of processing for modifying a video image.

Upon receiving the instruction to perform the scale processing, the scale unit 1300 obtains information associated with the object whose object ID 1511 indicates "ID3" in the object information 1510, i.e., the origin 1513, the size 1514 and the address 1516 (Step S200). Then, after reading the latest decoded image from the decoded image storage unit 1200 with reference to the address 1516, the scale unit 1300 performs the scale processing (Step S210) so as to generate a video image complying with the obtained origin 1513 and the size 1514 (Step S220).

After generating such a video image complying with the specified position and size into the video frame storage unit 1400, the scale unit 1300 transmits a notification of completion of scale processing to the video display control unit 1600 (Steps S230 and S231).

Although a video object is generated as a top layer according to the object information 1510 of FIG. 5A, it is permissible that another graphics object is generated and overlayed on top of the video object. In such a case, the stack 1515 of said another graphics object should indicate a smaller value than a value indicated by the stack 1515 of the video object. Likewise, in a case where there is more than one dummy video image, one video object may be overlayed on top of another video object.

In the present embodiment, all of the objects managed by the object information 1510 are displayed each time the size or the like of a dummy video image is modified (see Step S110). However, it is permissible to only read out (from the graphics data storage unit 2000) and generate an object that will be exposed to the eyes of the viewer (i.e., an image apart of which cannot be displayed even though it is supposed to be displayed) due to modification of the size or the like of a dummy video image.

For example, referring to the object information 1510 of FIG. 5A, if the dummy video image whose object ID 1511 is "ID3" is displayed in a smaller size than a dummy video image that is currently displayed, then a judgment will be made about whether a resulting superimposed image fails to display a part of an object to be layered beneath the dummy video image ("ID3"). In other words, as the stack 1515 of this object ("ID3") indicates "1", a judgment will be made about whether a resulting superimposed image fails to display parts of other objects whose stacks 1515 indicate "2" and "3", based on the origin 1513 and the size 1514 of each object. Then, out of said other objects, an object that has been judged to have an undisplayed part is generated.

Embodiment 2

<Overview>

In Embodiment 1, a dummy video image is generated based on a decoded image generated by decoding stream data of a moving image. As opposed to this, in the present embodiment, a dummy video image is generated based on a video image stored in the video frame storage unit 1400.

In Embodiment 1, the dummy video image is generated by enlarging/shrinking a decoded image. Here, if the difference between the size of the dummy video image and the size of the decoded image is large, it may take time to read the decoded image. Also, if the order of a scale filter is small, it may be necessary to enlarge/shrink the decoded image in several batches so as to prevent deterioration of the decoded image. In these cases, there may be times when generation of a dummy video image is time-consuming.

In view of the above, the present embodiment aims to generate a dummy video image based on a video image that is closest in size to the dummy video to be generated.

<Structure>

Figure 9:
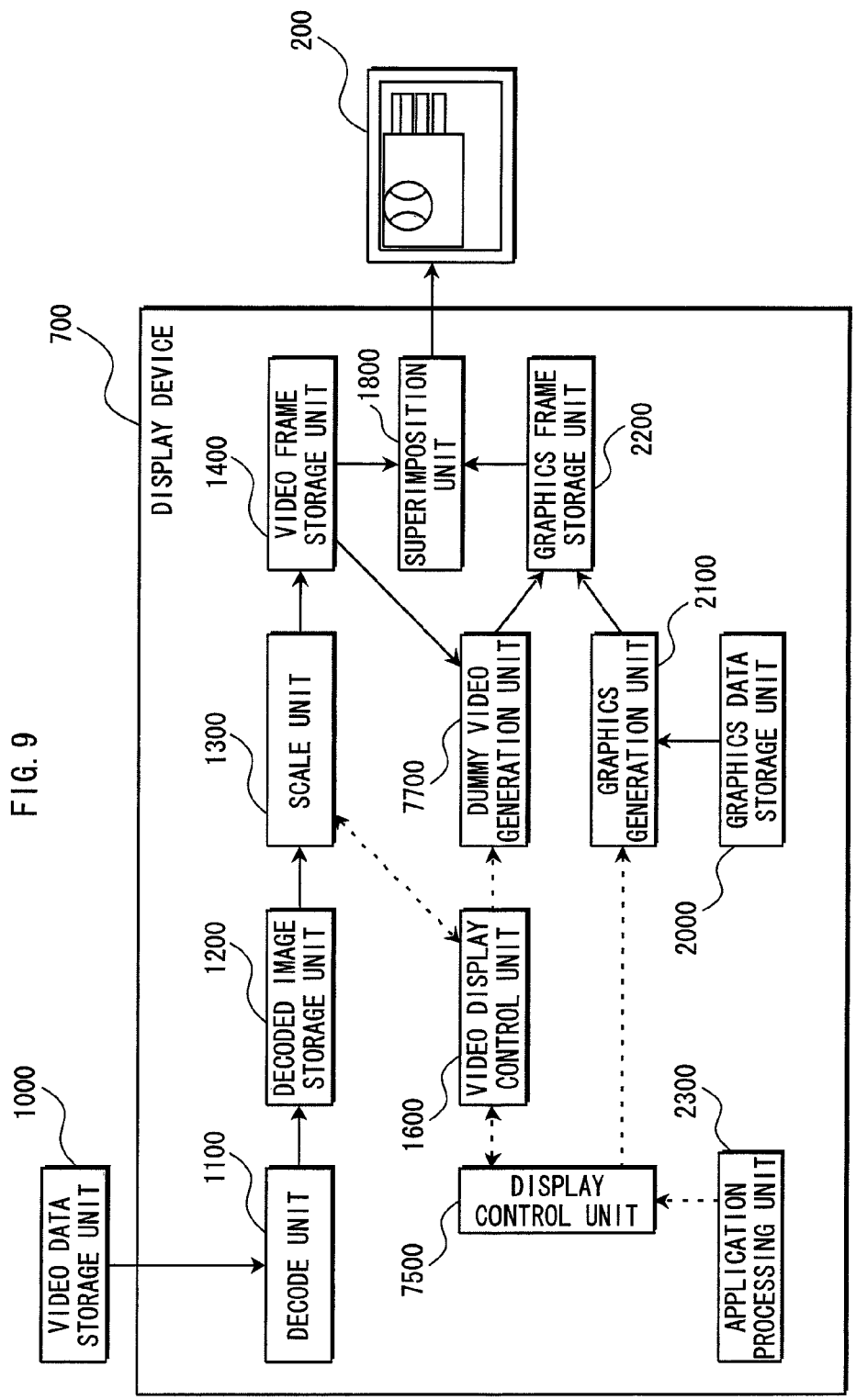
FIG. 9 is a functional block diagram of the structure of a display device 700 pertaining to Embodiment 2.

FIG. 9 is a functional block diagram of the structure of a display device 700 pertaining to the present embodiment.

The display device 700 includes: a decode unit 1110; a decoded image storage unit 1200; a scale unit 1300; a video frame storage unit 1400; a display control unit 7500; a video display control unit 1600; a dummy video generation unit 7700; a superimposition unit 1800; a graphics data storage unit 2000; a graphics generation unit 2100; a graphics frame storage unit 2200; and an application processing unit 2300.

The structure of the display device 700 is substantially the same as the structure of the display device 100 pertaining to Embodiment 1 (see FIG. 1). However, the display control unit 7500 and the dummy video generation unit 7700 of the display device 700 are different from their counterparts in the display device 100. Some functional components of the display device 700 are the same as their counterparts in the display device 100; these functional components are assigned the same reference numbers in FIGS. 1 and 9.

In Embodiment 1, when instructing the video display control unit 1600 to generate an image, the display control unit 1500 provides the video display control unit 1600 with an address of a decoded image based on which the dummy video image would be generated. The present embodiment is different from Embodiment 1 in that the display control unit 7500 provides the video display control unit 1600 with the origin 1522 and the size 1523 of an object whose image type 1521 indicates "video image" in the video image placement information 1520. In other words, the display control unit 7500 provides the position and the size of a video image in video frames.

In Embodiment 1, the dummy video generation unit 1700 reads image data, based on which a dummy video image would be generated, from the decoded image storage unit 1200. In contrast, the dummy video generation unit 7700 reads image data, based on which a dummy video image would be generated, from the video frame storage unit 1400.

<Data>

Major data pieces used in the display device 700 are the same as the data pieces used in the display device 100 of Embodiment 1, which are shown in FIG. 5.

<Operations>

Figure 10:
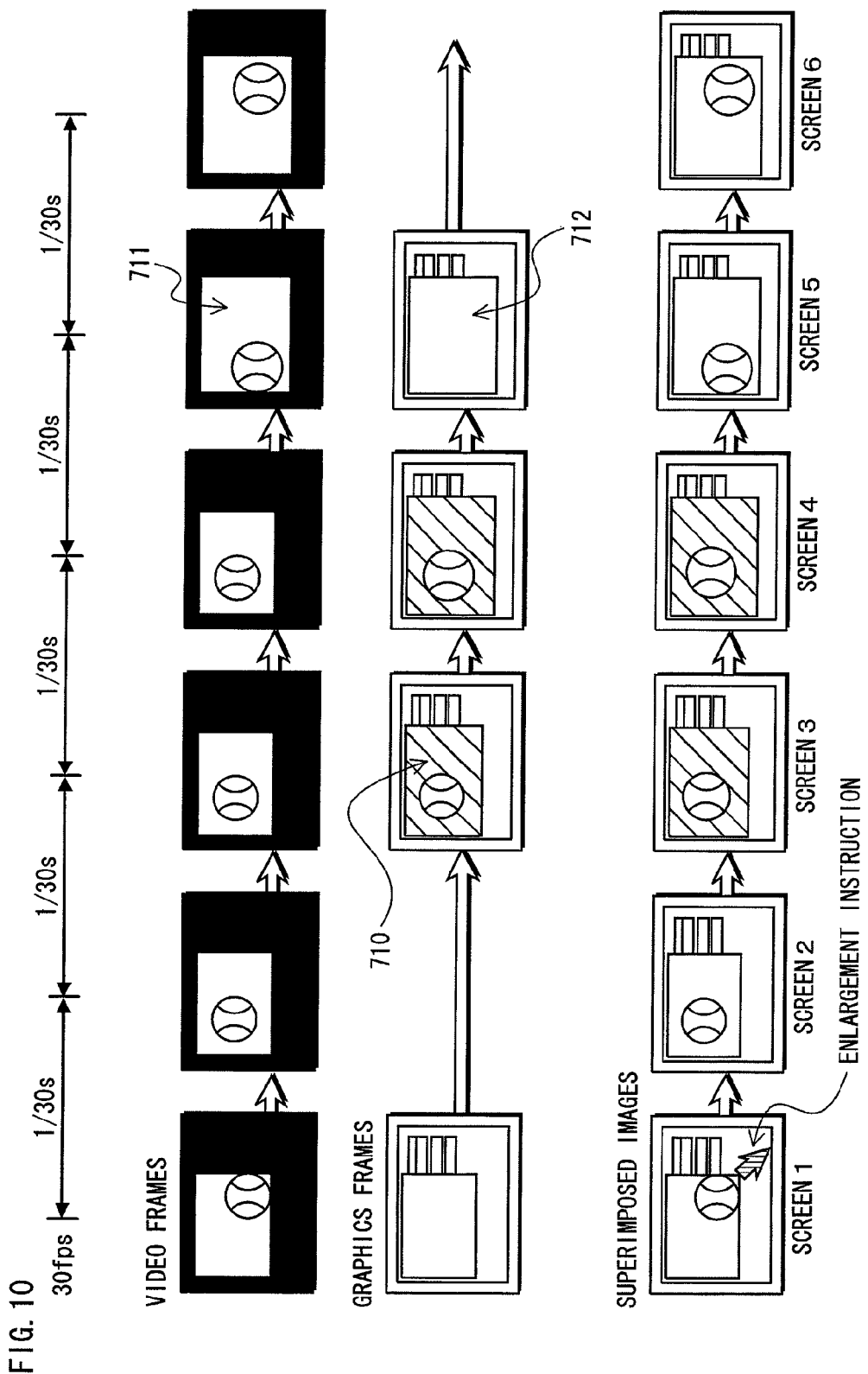
FIG. 10 shows how a video image is enlarged in Embodiment 2.

FIG. 10 shows how a video image is enlarged in the present embodiment.

In both of FIGS. 10 and 4 (Embodiment 1), a dummy video image is generated and displayed. However, as opposed to Embodiment 1 in which the dummy video image 320 is generated from a decoded image, a dummy video image 710 of the present embodiment is generated from a video image. As in Embodiment 1, upon generation of an enlarged video image 711 into a video frame, a transparent part 712 is generated into a graphics frame. As a result, an image generated by superimposing the video frame and the graphics frame is displayed. In FIG. 10, the dummy video image 710 has a diagonally hatched background.

Figure 11:
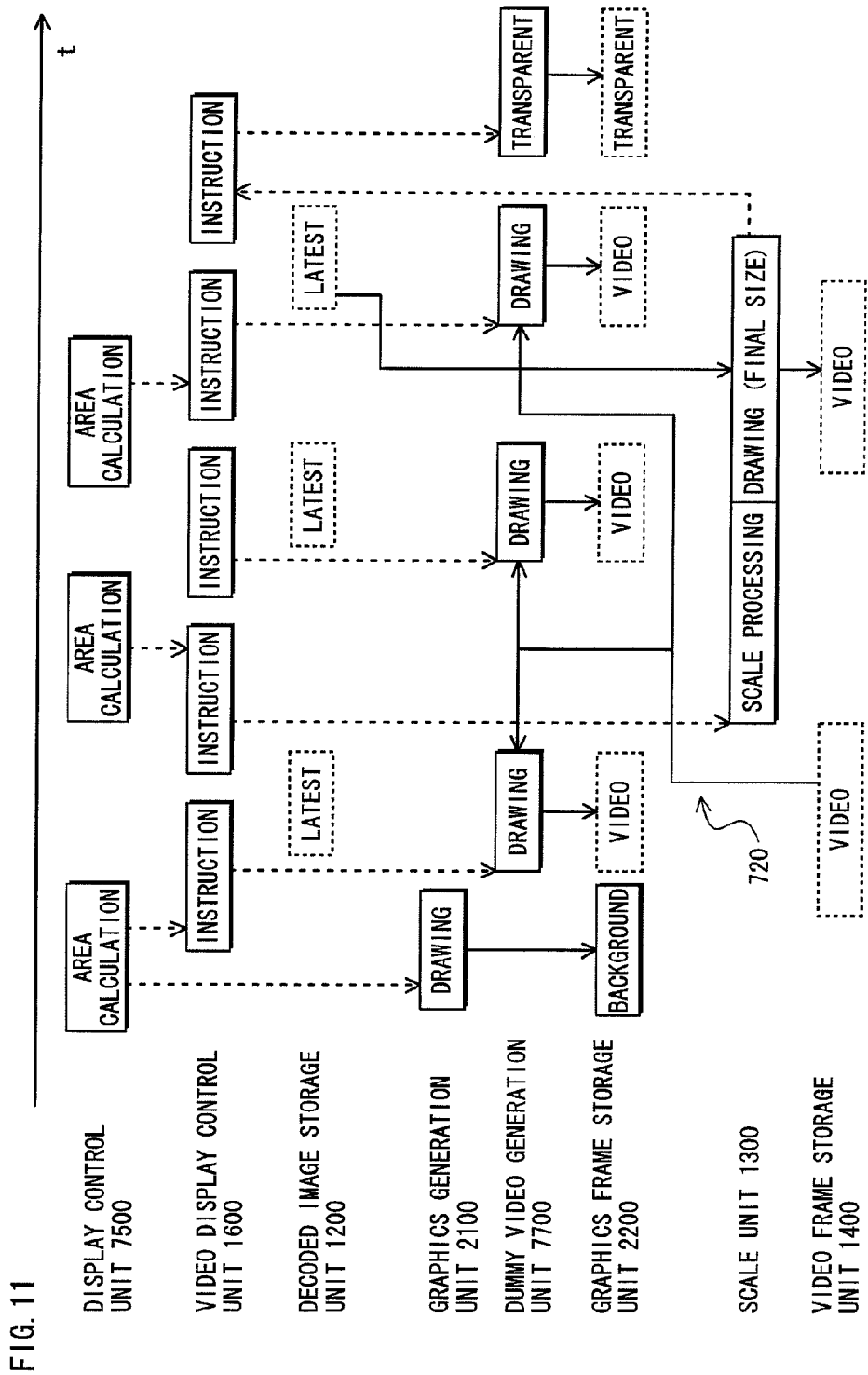
FIG. 11 is a timing diagram showing processing performed by functional components to enlarge the video image in Embodiment 2.
Figure 12:
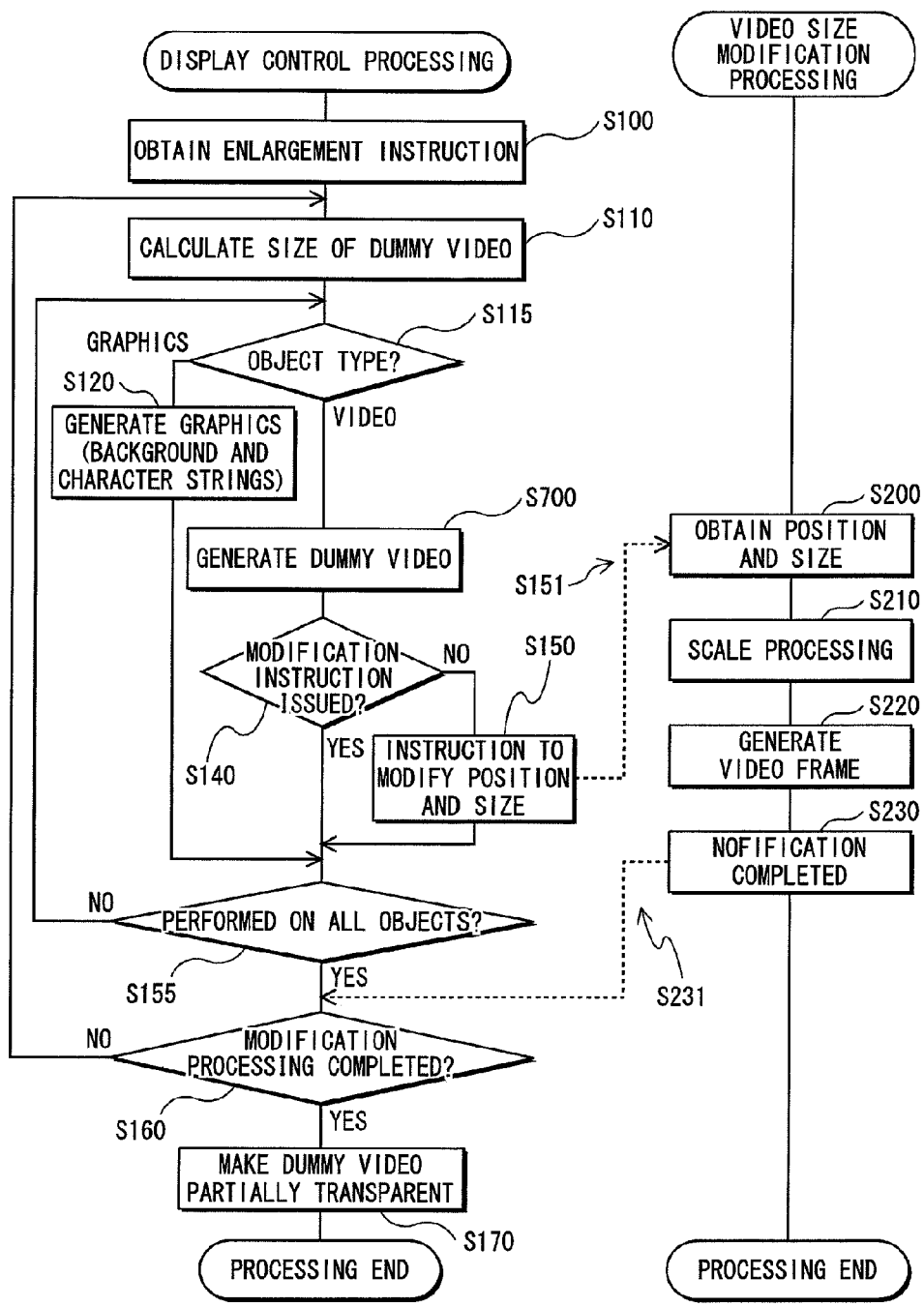
FIG. 12 is a flowchart of display control processing and modification processing for modifying the size or the like of the video image, pertaining to Embodiment 2.

The following describes the operations of the display device 700 pertaining to the present invention, with reference to FIGS. 11 and 12.

FIG. 11 is a timing diagram showing processing performed by functional components to enlarge a video image.

The timing diagram of FIG. 11 is substantially the same as the timing diagram pertaining to Embodiment 1 (see FIG. 7). FIG. 11 is different from FIG. 7 in that the dummy video generation unit 7700 reads image data from the video frame storage unit 1400 (transmission of image data, 720).

FIG. 12 is a flowchart of display control processing and modification processing for modifying the size or the like of a video image.

The flowchart of FIG. 12 is substantially the same as the flowchart explained in Embodiment 1 (see FIG. 8). FIG. 12 is different from FIG. 8 in that the dummy video generation unit 7700 reads image data from the video frame storage unit 1400 in Step S700.

With the focus on the difference between FIGS. 8 and 12, the following describes display control processing, which is performed by the display control unit 7500, the video display control unit 1600 and the dummy video generation unit 1700, and modification processing performed by the scale unit 1300.

Once the user inputs an instruction to enlarge a video image, the application processing unit 2300 detects the user input and instructs the display control unit 7500 to enlarge the video image. Upon receiving the instruction to enlarge the video image (Step S100), the display control unit 7500 calculates the position and the size of a dummy video image to be displayed (Step S110).

Upon calculating the position and size of the dummy video image, the display control unit 7500 generates all objects in accordance with the type 1512 and the stack 1515 of the object information 1510 (Steps S115-S155).

When generating a graphics image (Step S115: GRAPHICS), the display control unit 7500 instructs the graphics generation unit 2100 to generate a graphics object (Step S120).

On the other hand, when generating a dummy video image (Step S115: VIDEO), the display control unit 7500 (i) provides the video display control unit 1600 with (a) the calculated position and size of the dummy video image and (b) the origin and the size of the video image, and (ii) instructs the video display control unit 1600 to generate the dummy video image. Specifically, the origin and the size of the video image denote the origin 1522 and the size 1523 of an object whose image type 1521 indicates "video image" in the video image placement information 1520.

The video display control unit 1600 (i) provides the dummy video generation unit 7700 with information (e.g., the origin) received from the display control unit 7500, and (ii) instructs the dummy video generation unit 7700 to read, from the video frame storage unit 1400, an imaged based on which the dummy video image would be generated, and to generate the dummy video image.

Upon receiving such an instruction, the dummy video generation unit 7700 (i) reads the video image from the video frame storage unit 1400, and (ii) generates, into the graphics frame storage unit 2200, the dummy video image based on the read video image (Step S700).

After issuing the instruction to generate the objects, the video display control unit 1600 instructs the scale unit to modify the video image to comply with a specified size or the like (Step S150), if the video display control unit 1600 has not instructed the scale unit to perform such scale processing on the video image yet (Step S140: NO).

When there is one or more objects that have not been displayed yet (Step S155: NO), the next object—i.e., an object whose stack 1515 indicates the next largest value—is generated (Step S115).

If the notification of completion of scale processing has not been received from the scale unit 1300 yet (Step S160: NO) even after all objects were generated (Step S155: YES), the video display control unit 1600 notifies the display control unit 7500 that the scale processing has not been completed yet. Upon receiving the notification that the scale processing has not been completed yet, the display control unit 7500 calculates the position and the size of a dummy video image to be displayed next (Step S110) and repeats processing from Steps S115 to S160.

If the notification of completion of scale processing has been received from the scale unit 1300 (Step S160: YES), the video display control unit 1600 notifies the display control unit 7500 that the scale processing has been completed, and instructs the dummy video generation unit 7700 to make a part of the dummy video image, which would be positioned over the video image, transparent.

Upon receiving such an instruction, the dummy video generation unit 7700 makes the part of the dummy video image transparent (Step S170). After the display control unit 7500 is notified of the completion of scale processing, the display control unit 7500 terminates the processing of modifying a video image.

Upon receiving the instruction to perform the scale processing, the scale unit 1300 obtains the position, size and address (Step S200). Then, after reading the latest decoded image from the decoded image storage unit 1200 with reference to the address 1516, the scale unit 1300 performs scale processing on the read decoded image (Step S210) so as to generate a video image to be displayed (Step S220). After generating such a video image, the scale unit 1300 notifies the video display control unit 1600 of the completion of scale processing (Steps S230 and S231).

Embodiment 3

<Overview>

In Embodiment 1, a dummy video image is generated based on a decoded image, which is an image generated by decoding stream data of a moving image. In embodiment 2, a dummy video image is generated based on a video image stored in the video frame storage unit 1400. As opposed to these embodiments, the present embodiment aims to select one of a decoded image and a video image, and generate a dummy video image based on the selected image.

Especially, in order to further reduce the time to read image data or perform processing of shrinking an image, the present embodiment aims to select one of the following whose size is closer to the size of the dummy video image than the other, and generate the dummy video image based on the selected image: (i) a decoded image; and (ii) a video image.

For example, when decoded images generated from video data pieces have different sizes, it is possible to select an image based on which the dummy video image is generated, in accordance with the sizes of the decoded images. This has the effect of reducing the time required to generate the dummy video image.

<Structure>

Figure 13:
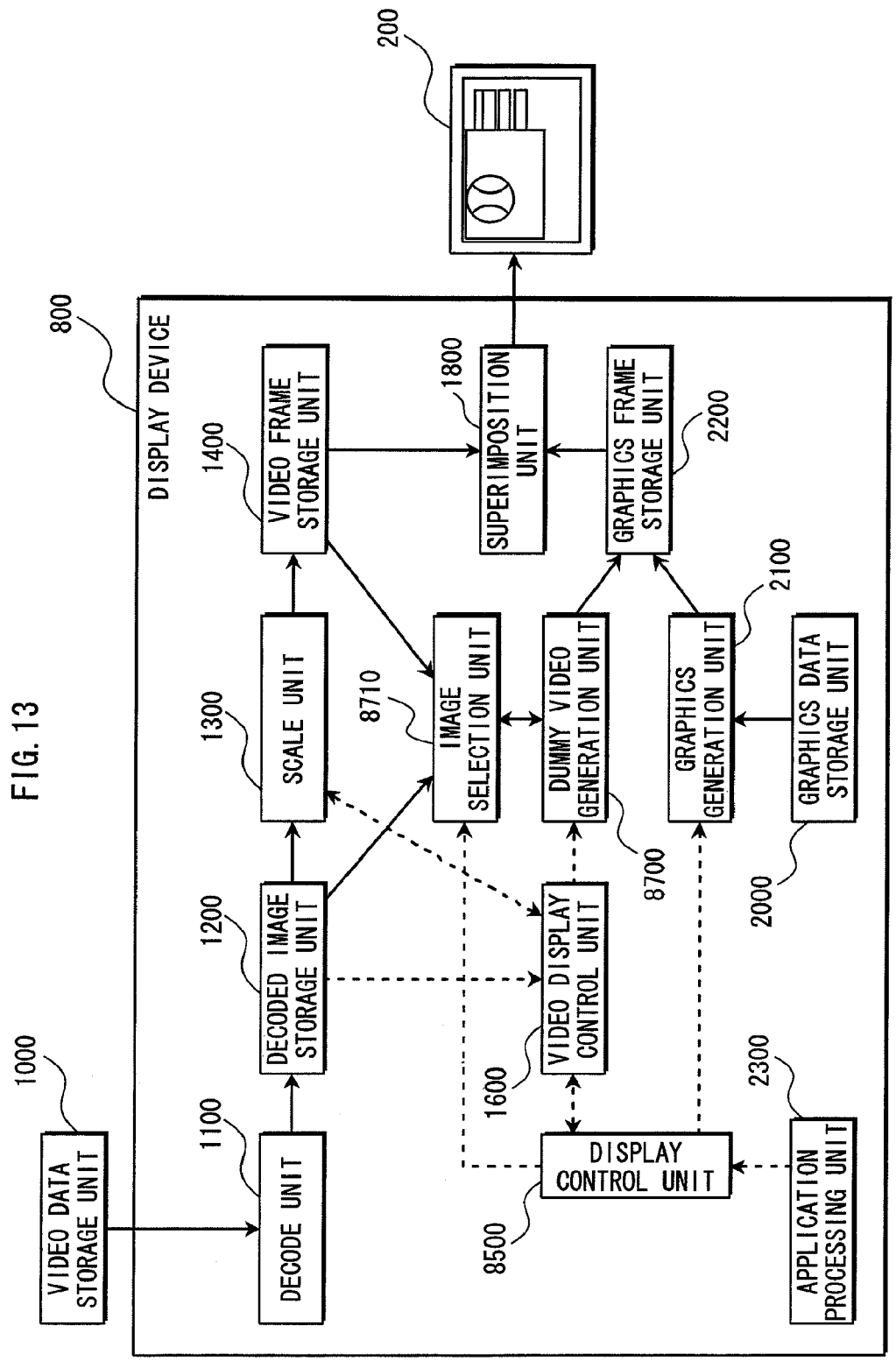
FIG. 13 is a functional block diagram showing the structure of a display device 800 pertaining to Embodiment 3.

FIG. 13 is a functional block diagram showing the structure of a display device 800 pertaining to the present embodiment.

The display device 800 includes: a decode unit 1100; a decoded image storage unit 1200; a scale unit 1300; a video frame storage unit 1400; a display control unit 8500; a video display control unit 1600; a dummy video generation unit 8700; an image selection unit 8710; a superimposition unit 1800; a graphics data storage unit 2000; a graphics generation unit 2100; a graphics frame storage unit 2200; and an application processing unit 2300.

The structure of the display device 800 is substantially the same as the structure of the display device 100 pertaining to Embodiment 1 (see FIG. 1). However, the display control unit 8500 and the dummy video generation unit 8700 of the display device 800 are different from their counterparts in the display device 100. Furthermore, the display control unit 8500 additionally includes the image selection unit 8710. Some functional components of the display device 800 are the same as their counterparts in the display device 100; these functional components are assigned the same reference numbers in FIGS. 1 and 13.

The display control unit 8500 has not only the function of the display control unit 1500 pertaining to Embodiment 1, but also the function of notifying the image selection unit 8710 of the size of the current video image upon receiving an instruction to enlarge the video image from the application processing unit 2300. More specifically, the display control unit 8500 notifies the image selection unit 8710 the size 1523 of an object whose image type 1521 indicates "video image" in the video image placement information 1520.

The dummy video generation unit 1700 of Embodiment 1 reads image data, based on which a dummy video image is to be generated, from the decoded image storage unit 1200. As opposed to this, the dummy video generation unit 8700 of the present embodiment provides the image selection unit 8710 with the size of the dummy video image, and then receives image data from the image selection unit 8710.

After receiving the size of the dummy video image to be generated from the dummy video generation unit 8700, the image selection unit 8710 selects one of the following whose size is closer to the size of the dummy video image than the other: (i) the current video image and the decoded image. The size of the current video image is notified by the display control unit 8500. The size of the decoded image is provided by the dummy video generation unit 8700, together with the size of the dummy video image.

The image selection unit 8710 can read the selected image data, and provide the read image data to the dummy video generation unit 8700.

<Data>

Major data pieces used in the display device 800 are the same as the data pieces used in the display device 100 of Embodiment 1, which are shown in FIG. 5.

<Operations>

Figure 14:
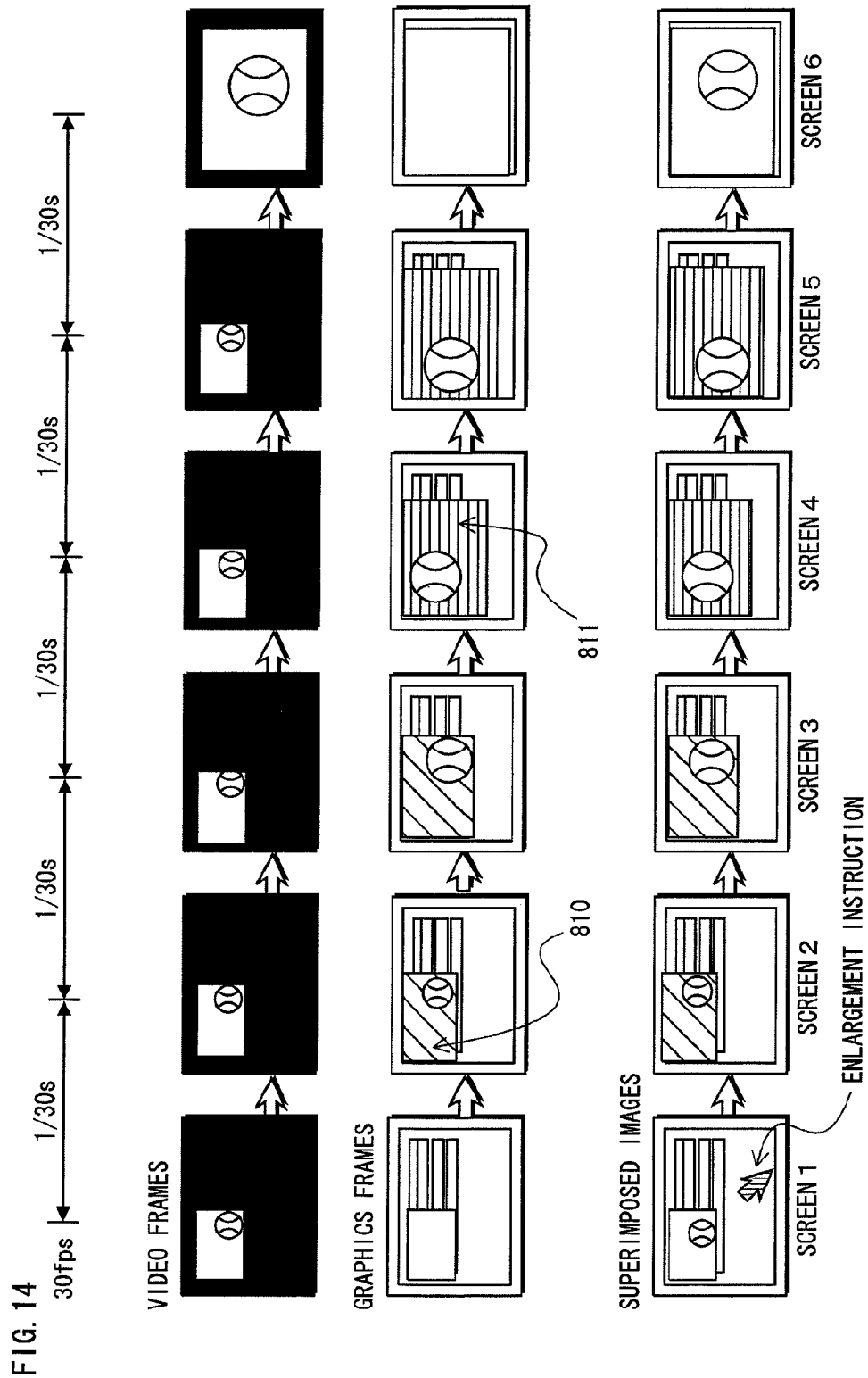
FIG. 14 shows how a video image is enlarged in Embodiment 3.

FIG. 14 shows how a video image is enlarged in the present embodiment.

In FIG. 14, a dummy video image 811 generated from a decoded image has a horizontally hatched background, whereas a dummy video image 810 generated from a video image has a diagonally hatched background.

That is to say, the dummy video image 810 is generated from the video image, and the dummy video image 811 is generated from the decoded image.

Figure 15:
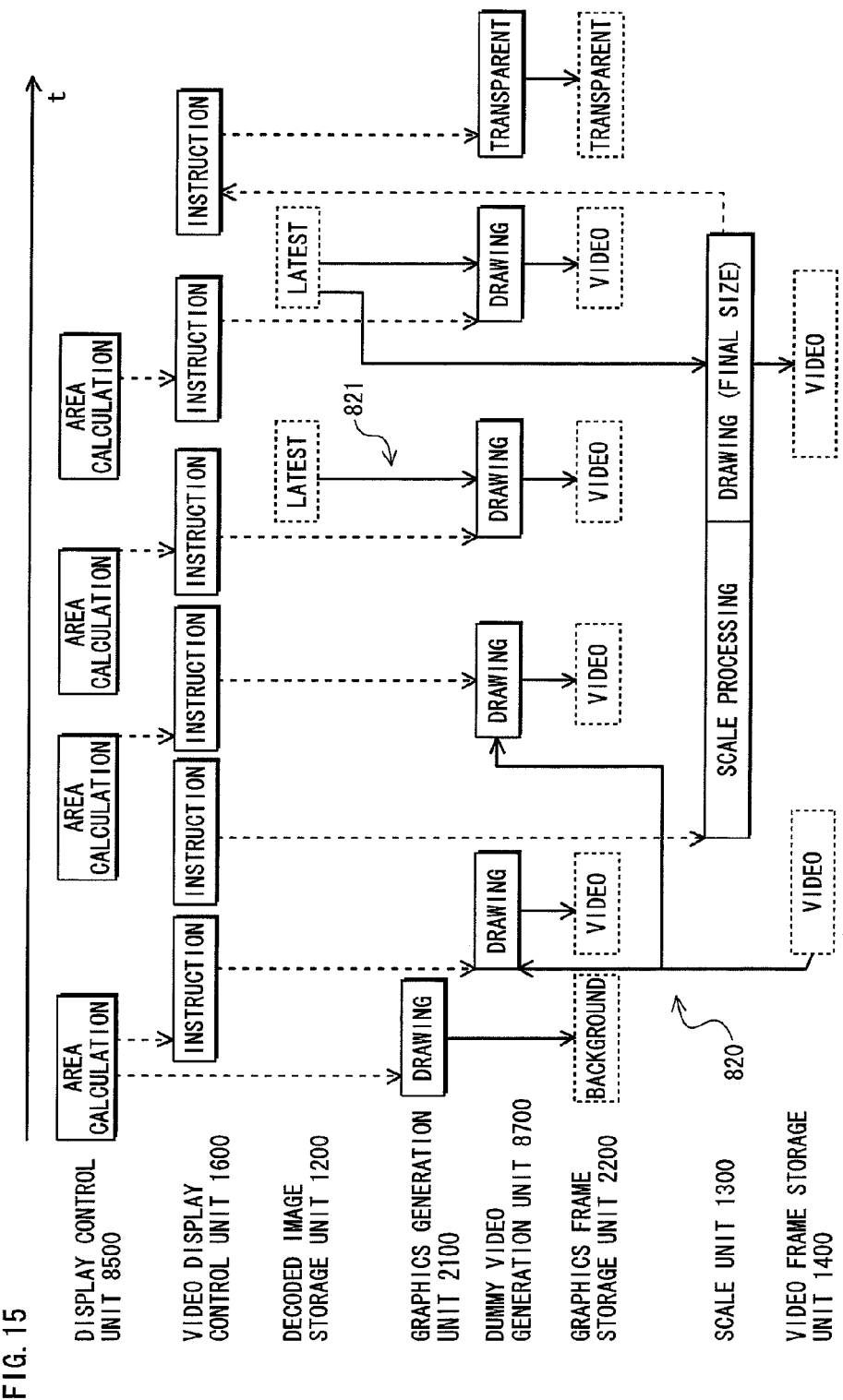
FIG. 15 is a timing diagram showing processing performed by functional components to enlarge the video image in Embodiment 3.
Figure 16:
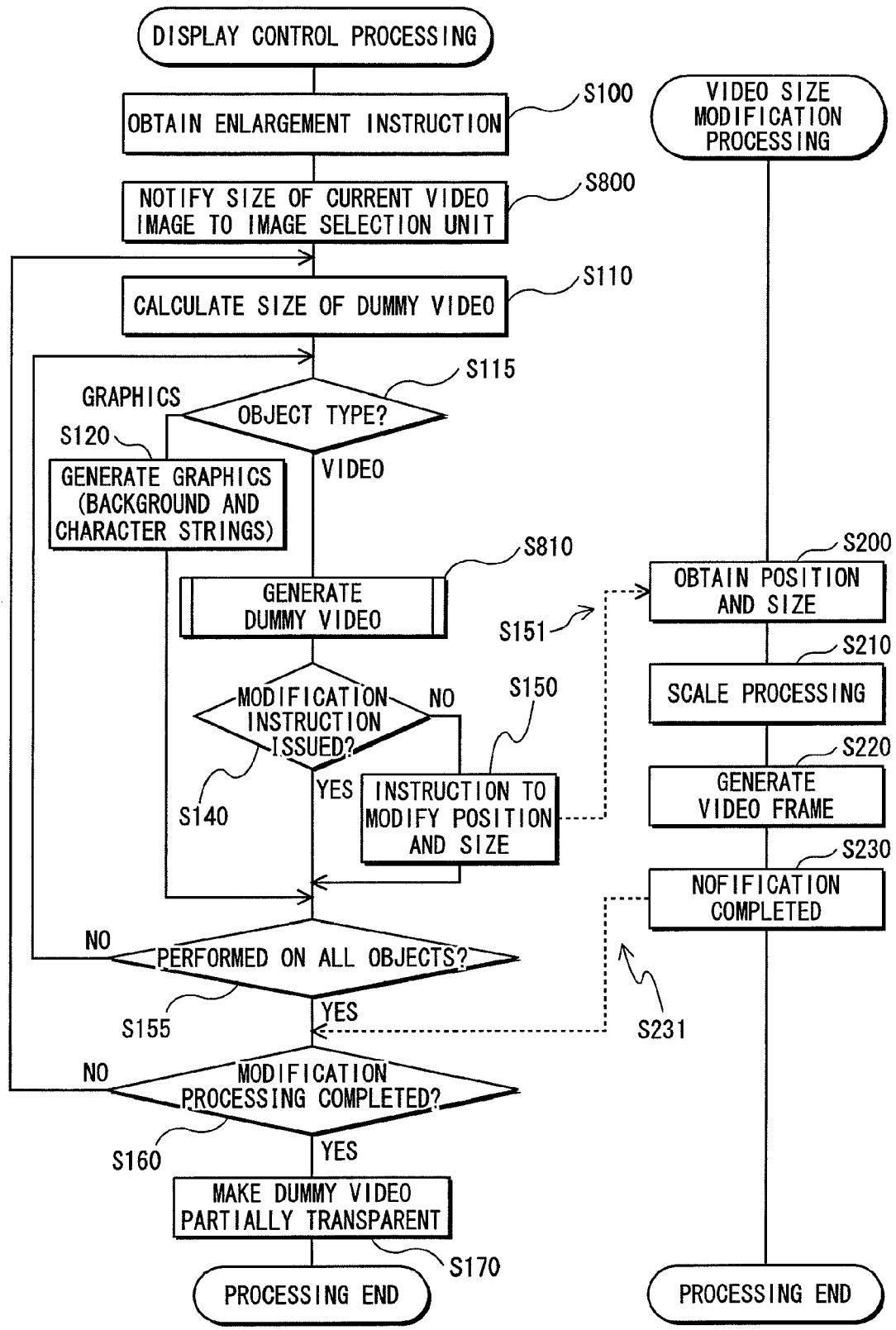
FIG. 16 is a flowchart of display control processing and modification processing for modifying the size or the like of the video image, pertaining to Embodiment 3.
Figure 17:
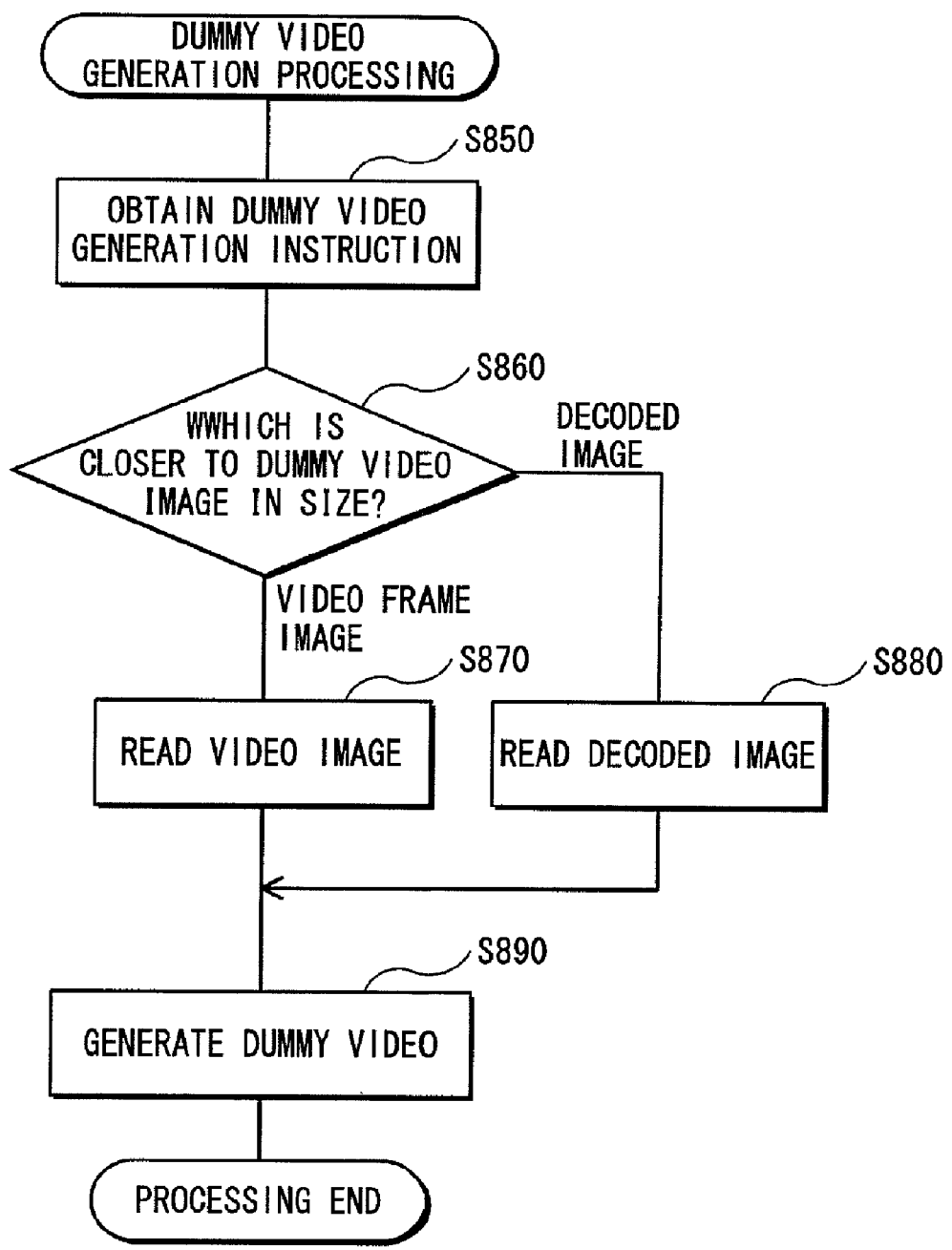
FIG. 17 is a flowchart of processing for generating a dummy video image pertaining to Embodiment 3.

The following describes the operations of the display device 800 pertaining to the present invention, with reference to FIGS. 15 to 17.

FIG. 15 is a timing diagram showing processing performed by functional components to enlarge a video image.

The timing of FIG. 15 is substantially the same as the timing diagram pertaining to Embodiment 1 (see FIG. 7). FIG. 15 is different from FIG. 7 in that the dummy video generation unit 8700 reads image data from the decoded image storage unit 1200 or the video frame storage unit 1400 (transmission of image data, 820 and 821).

FIG. 16 is a flowchart showing display control processing and modification processing for modifying the size or the like of a video image, which are performed in the display device 800. FIG. 17 is a flowchart showing dummy video generation processing.

The flowchart of FIG. 16 is substantially the same as the flowchart explained in Embodiment 1 (see FIG. 8). FIG. 16 is different from FIG. 8 in that (i) the display control unit 8500 notifies the image selection unit 8710 of the size of the current video image (Step S800), and (ii) the image selection unit 8700 selects an image based on which a dummy video image is to be generated, and generates the dummy video image based on the selected image (Step S810). The processing of Step S810 will be described later with reference to FIG. 17.

With the focus on the difference between FIGS. 8 and 16, the following describes, with reference to FIG. 16, display processing performed by the display control unit 8500, the video display control unit 1600 and the dummy video generation unit 8700, and modification processing performed by the scale unit 1300.

Once the user inputs an instruction to enlarge a video image, the application processing unit 2300 detects the user input and instructs the display control unit 8500 to enlarge the video image. Upon receiving the instruction to enlarge the video image (Step S100), the display control unit 8500 calculates the position and the size of a dummy video image to be displayed (Step S110).

The display control unit 8500 notifies the image selection unit 8710 of the size of the current video image (Step S800). Upon receiving such a notification, the image selection unit 8710 stores, into an internal memory thereof, the size of the current video image.

Upon calculating the position and size of the dummy video image, the display control unit 8500 generates all objects in accordance with the type 1512 and the stack 1515 of the object information 1510 (Steps S115-S155).

When generating a graphics image (Step S115: GRAPHICS), the display control unit 8500 instructs the graphics generation unit 2100 to generate a graphics object (Step S120).

On the other hand, when generating a dummy video image (Step S115: VIDEO), the display control unit 8500 (i) provides the video display control unit 1600 with the calculated position and size of the dummy video image and the address of the decoded image, and (ii) instructs the video display control unit 1600 to generate the dummy video image. The video display control unit 1600 (i) obtains the size of the decoded image from the decoded image storage unit 1200, (ii) provides the dummy video generation unit 8700 with (a) the acquired size and (b) information associated with the dummy video (e.g., the origin) received by the display control unit 8500, and (iii) instructs the dummy video generation unit 8700 to generate the dummy video image.

Upon receiving such an instruction, the dummy video generation unit 8700 generates the dummy video image into the graphics frame storage unit 2200.

After issuing the instruction to generate the objects, the video display control unit 1600 instructs the scale unit to modify the video image to comply with a specified size or the like (Step S150), if the video display control unit 1600 has not instructed the scale unit to perform such scale processing on the video image yet (Step S140: NO).

When there is one or more objects that have not been displayed yet (Step S155: NO), the next object—i.e., an object whose stack 1515 indicates the next largest value—is generated (Step S115).

If the notification of completion of scale processing has not been received from the scale unit 1300 yet (Step S160: NO) even after all objects were generated (Step S155: YES), the video display control unit 1600 notifies the display control unit 8500 that the scale processing has not been completed yet. Upon receiving the notification that the scale processing has not been completed yet, the display control unit 8500 calculates the position and the size of a dummy video image to be displayed next (Step S110) and repeats processing from Steps S115 to S160.

If the notification of completion of scale processing has been received from the scale unit 1300 (Step S160: YES), the video display control unit 1600 notifies the display control unit 8500 that the scale processing has been completed, and instructs the dummy video generation unit 8700 to make a part of the dummy video image, which would be positioned over the video image, transparent.

Upon receiving such an instruction, the dummy video generation unit 8700 makes the part of the dummy image transparent (Step S170). After the display control unit 8500 is notified of the completion of scale processing, the display control unit 8500 terminates the processing of modifying a video image.

Upon receiving the instruction to perform the scale processing, the scale unit 1300 obtains the position, size and address (Step S200). Then, after reading the latest decoded image from the decoded image storage unit 1200 with reference to the address 1516, the scale unit 1300 performs scale processing (Step S210) so as to generate a video image to be displayed (Step S220). After generating such a video image, the scale unit 1300 notifies the video display control unit 1600 of the completion of scale processing (Steps S230 and S231).

The following describes dummy video generation processing performed by the display device 800 (Step S810), with reference to FIG. 17.

Upon receiving the instruction to generate the dummy video image, the dummy video generation unit 8700 (i) provides the image selection unit 8710 with the size and address of the decoded image and the size of the dummy video image, which have been received by the video display control unit 1600, and (ii) instructs the image selection unit 8710 to read image data.

Upon receiving such an instruction (Step S850), the image selection unit 8710 judges which one of the following is closer to the size of the dummy video image than the other: the size of the current video image, which has been received by the display control unit 8500; and the size of the decoded image, which has been received by the dummy video generation unit 8700 (Step S860).

When judging that the size of the decoded image is closer (Step S860: DECODED IMAGE), the image selection unit 8710 reads the decoded image from the decoded image storage unit 1200, and returns the read decoded image to the dummy video generation unit 8700.

When judging that the size of the video image is closer (Step S860: VIDEO IMAGE), the image selection unit 8710 reads the video image from the video frame storage unit, and returns the read video image to the dummy video generation unit 8700.

Upon receiving image data from the image selection unit 8710, the dummy video generation unit 8700 generates the dummy video image from the received image (Step S890).

<Additional Remarks>

The present invention is not limited to the above-described embodiments. The following variations are applicable to the present invention.

(1) In the above embodiments, once the notification of completion of scale processing has been received from the scale unit 1300, a part of a graphics image is made transparent. Alternatively, apart of a graphics image may be made transparent when a predetermined time period has passed. In this case, however, the predetermined time period must be longer than a time period required to perform the scale processing.

(2) The above embodiments have exemplarily explained how to enlarge a video image. However, instead of enlarging the video image, it is permissible that the video image be shrunk or moved. For example, the following describes a case where the video image is shrunk. After a graphics image (e.g., background) is drawn, a video image is generated in such a manner that its size is gradually reduced, and then the video image is displayed.

(3) According to the above embodiments, a dummy video image is an image showing the same objects as a video image; that is, a dummy video image is generated from one of (i) a video image itself and (ii) a decoded image from which the video image is generated. However, the dummy video image may be an image generated by modifying the objects shown in the video image, or an image that shows completely different objects from the video image.

Further, the shape of a dummy video image is not limited to a rectangular shape. A dummy video image may have, for example, a circular or an ellipsoidal shape.

For example, a dummy video image may be displayed with various display effects added thereto by using a 3D graphics technique. For instance, the dummy video image may be displayed with its rectangular area being rotated.

(4) In the above embodiments, the scale filter used for generating a video image is of a higher-order than that used for generating a dummy video image. However, the scale filter used for generating a video image may have the same characteristics as that used for generating a dummy video image.

For example, when a video image and a dummy image are generated using the filters of the same characteristics, an image stored in the graphics frame storage unit 2200 needs to have a lower resolution than an image stored in the video frame storage unit 1400. Here, as the image stored in the graphics frame storage unit 2200 has a lower resolution, it takes less time to process such an image. This way, a dummy video image can be generated while enlarging/shrinking a video image.

When the resolution of the image stored in the graphics frame storage unit 2200 is lower, the graphics image is enlarged, superimposed with a video image, and displayed. In this case, when the dummy video image is switched to a video image—i.e., when a part of the graphics image is made transparent so that the video image is displayed therethrough, the difference in the image resolutions may be noticeable. When such a difference is noticeable, the transparency of the transparent part of the graphics image, through which the video image is displayed, may be gradually increased, so as to make the difference in the image resolutions less noticeable. Here, the transparency must be adjusted in accordance with a status of the video image; for example, the graphics image should be opaque whenever the video image is being drawn.

In a case where a dummy video image is switched to a video image, it is permissible to gradually change the superimposition ratio between the video image and the graphics image on a pixel-by-pixel basis regardless of image resolution, so that the dummy video image is smoothly switched to the video image.

(5) In the above embodiments, a dummy video image is displayed while scale processing is performed on a video image. However, a dummy video image may be displayed before/after the scale processing on the video image as well. For example, until an enlarged video image is displayed, it is permissible to display a dummy video image whose size is gradually modified, so that scaling of a video image looks smooth on the screen.

(6) All or part of the constituent elements of the display devices shown in FIGS. 1, 19 and 13 may be realized as integrated circuits on one chip or a plurality of chips.

(7) All or part of each constituent element of the display devices shown in FIGS. 1, 19 and 13 may be realized as a computer program, or may be realized in any other embodiments. When all or part of each constituent element is realized as a computer program, the computer program may be executed by making a computer read a recording medium (e.g., a memory card and CD-ROM) having recorded thereon the computer program, or by making the computer program downloaded via a network.

INDUSTRIAL APPLICABILITY

The present invention can be applied when modifying display statuses of a moving image and a still image that are displayed on the same screen.

The invention claimed is:

1. A display device, comprising:
   a first memory;
   a second memory;
   a first image generation unit configured to generate a first image into the first memory, the first image complying with a predetermined display size and a predetermined display position;
   a second image generation unit configured to generate a second image into the second memory;
   an acquisition unit configured to acquire a modification instruction for modifying the display size and the display position of the first image;
   a display unit configured to display the second image together with the first image so that the second image is overlayed on top of the first image;
   a control unit configured to:
      (i) before the acquisition unit acquires the modification instruction, control the first image generation unit to generate the first image into the first memory and control the second image generation unit to generate a first partially transparent second image into the second memory as the second image, the first partially transparent second image having a transparent part positioned over the first image displayed by the display unit;
      (ii) after the acquisition unit has acquired the modification instruction, control the first image generation unit to start modifying the display size and the display position of the first image;
      (iii) after the acquisition unit has acquired the modification instruction and until the modification of the first image is completed, control the second image generation unit to generate an opaque second image into the second memory as the second image, the opaque second image being large enough in size to cover the first image being modified by the first image generation unit and being displayed by the display unit; and (iv) after the modification of the first image has been completed, control the second image generation unit to generate a second partially transparent second image into the second memory as the second image, the second partially transparent second image having a transparent part positioned over the modified first image displayed by the display unit.

2. The display device of claim 1, wherein:
the first image generation unit is further configured to generate the first image into the first memory in accordance with frame images constituting a moving image; and
the opaque second image is generated in accordance with the frame images, in accordance with which the first image is generated.

3. The display device of claim 2, wherein:
the second image generation is further configured to generate the opaque second image in a shorter time period than the first image is generated; and
the opaque second image is less accurate than the first image.

4. The display device of claim 2, wherein the opaque second image includes (i) a first part whose display size and display position respectively comply with the display size and the display position of the first image, and (ii) a second part that is other than the first part.

5. The display device of claim 2, wherein the second image generation unit is further configured to generate the opaque second image from one of the following that is closer to the opaque second image than another in size: (i) the frame images, from which the first image is generated, and (ii) the first image that is stored in the first memory.

6. The display device of claim 1, wherein:
the first image generation unit is further configured to generate the first image into the first memory from frame images constituting a moving image; and
the opaque second image is generated in accordance with the first image that is stored in the first memory.

7. An image display method used in a display device including (i) a first memory and a second memory, each of which stores therein an image, and (ii) a screen, the image display method comprising:
generating a first image into the first memory, the first image complying with a predetermined display size and a predetermined display position;
generating a second image into the second memory;
acquiring a modification instruction for modifying the display size and the display position of the first image;
displaying the second image stored in the second memory together with the first image stored in the first memory so that the second image is overlayed on top of the first image; and
controlling:
(i) before acquiring the modification instruction in the acquiring step, the first image generating step to generate the first image into the first memory, and the second image generating step to generate a first partially transparent second image into the second memory as the second image, the first partially transparent second image having a transparent part positioned over the first image during the displaying;
(ii) after acquiring the modification instruction in the acquiring step, the first image generating step to start modifying the display size and the display position of the first image;
(iii) after acquiring the modification instruction in the acquiring step and until the modification of the first image is completed, the second image generating step to generate an opaque second image into the second memory as the second image, the opaque second image being large enough in size to cover the first image being modified during the displaying; and
(iv) after completion of the modification of the first image, the second image generation step to generate a second partially transparent second image into the second memory as the second image, the second partially transparent second image having a transparent part positioned over the modified first image during the displaying.

* * * * *